United States Patent
Semb et al.

(10) Patent No.: US 11,940,582 B2
(45) Date of Patent: Mar. 26, 2024

(54) SEISMIC DATA ACQUISITION UNIT APPARATUS AND POSITIONING SYSTEMS AND METHODS

(71) Applicant: Magseis FF LLC, Houston, TX (US)

(72) Inventors: Per Helge Semb, Gullaug (NO); Ivar Gimse, Lysaker (NO); Camille Isabelle Marie Lapierre, Stabekk (NO); Asgeir Sunnanå, Bekkestua (NO)

(73) Assignee: Magseis FF LLC, Houston, TX (US)

( * ) Notice: Subject to any disclaimer, the term of this patent is extended or adjusted under 35 U.S.C. 154(b) by 30 days.

(21) Appl. No.: 17/360,334

(22) Filed: Jun. 28, 2021

(65) Prior Publication Data
US 2021/0405237 A1   Dec. 30, 2021

Related U.S. Application Data

(60) Provisional application No. 63/045,501, filed on Jun. 29, 2020.

(51) Int. Cl.
*G01V 1/38* (2006.01)
(52) U.S. Cl.
CPC .......... *G01V 1/3852* (2013.01); *G01V 1/3808* (2013.01); *G01V 1/3835* (2013.01); *G01V 1/3826* (2013.01); *G01V 2210/1427* (2013.01)
(58) Field of Classification Search
CPC .. G01V 1/3852; G01V 1/3808; G01V 1/3835; G01V 2210/1427; G01V 1/18; G01V 1/162
See application file for complete search history.

(56) References Cited

U.S. PATENT DOCUMENTS

| 9,876,543 | B2 | 1/2018 | Alexander et al. | |
| 2006/0201243 | A1* | 9/2006 | Auffret | G01V 1/38 73/170.29 |
| 2008/0080318 | A1* | 4/2008 | Maxwell | H04B 11/00 367/131 |
| 2012/0312215 | A1* | 12/2012 | Lyons | B64D 25/18 114/54 |
| 2015/0109883 | A1 | 4/2015 | Vangasse et al. | |

(Continued)

FOREIGN PATENT DOCUMENTS

| CN | 108614291 A | 10/2018 |
| CN | 110488346 A | 11/2019 |
| WO | 2020051950 A1 | 3/2020 |

OTHER PUBLICATIONS

International Search Report and Written Opinion dated Oct. 5, 2021 for International Application No. PCT/US2021/039380, 12 pages.

*Primary Examiner* — Ian J Lobo
(74) *Attorney, Agent, or Firm* — Sage Patent Group

(57) ABSTRACT

A seismic data acquisition positioning apparatus is provided. The apparatus can include a seismic data acquisition unit. The unit can include a case having an internal compartment. The unit can include a power source, a clock, a seismic data recorder, a control unit, and at least one sensor disposed within the case. The apparatus can include a hanging unit including a beacon unit. The apparatus can include a connector having a first end coupled with the seismic data acquisition unit and having a second end coupled with the hanging unit. The connector can pivot about the first end of the connector.

14 Claims, 22 Drawing Sheets

(56) References Cited

U.S. PATENT DOCUMENTS

2016/0187517 A1\* 6/2016 Brenders .............. G01V 1/3808
367/49
2019/0233070 A1 8/2019 Hartland
2019/0302301 A1 10/2019 Fyffe et al.

\* cited by examiner

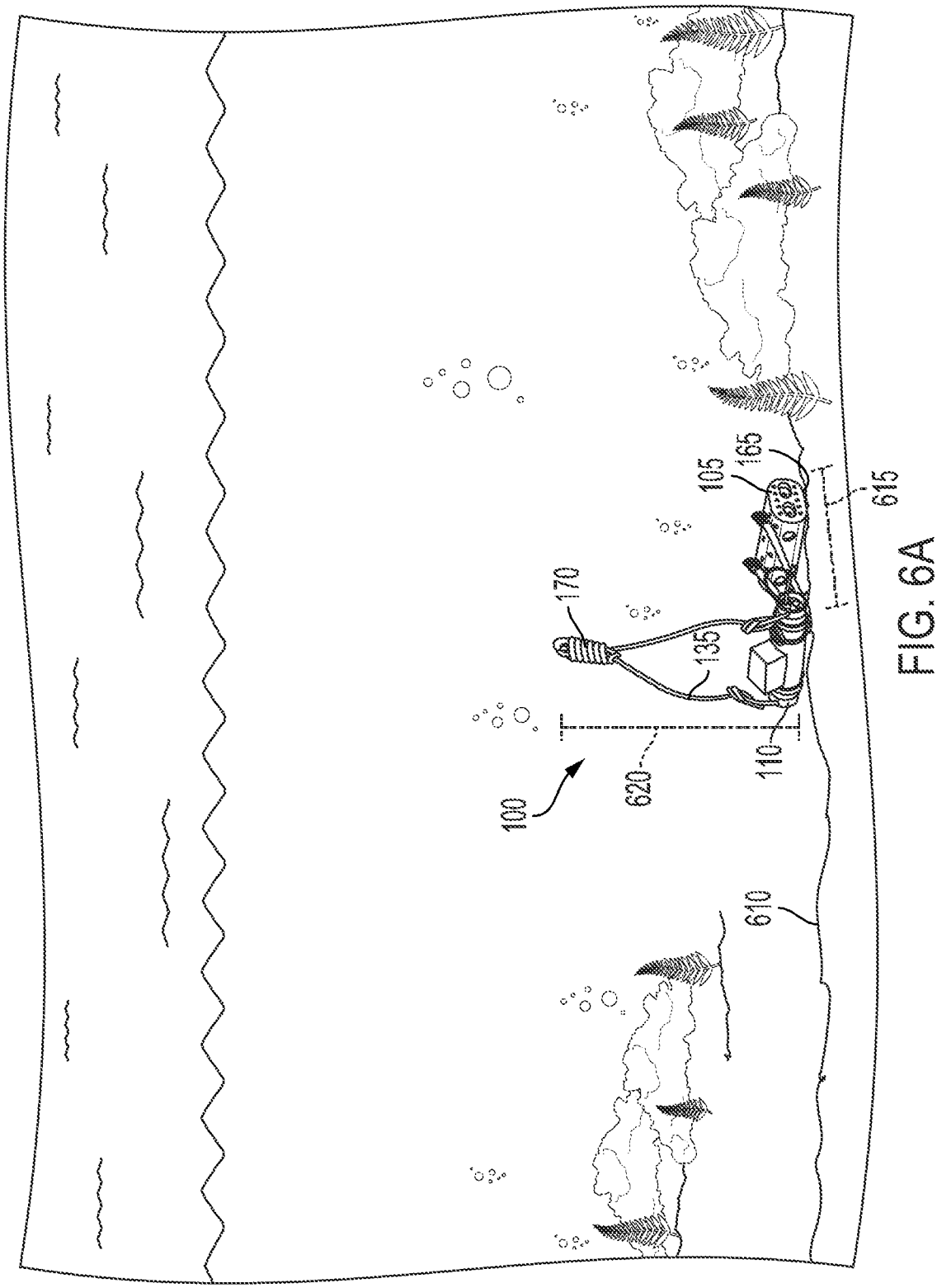

US 11,940,582 B2

SEISMIC DATA ACQUISITION UNIT APPARATUS AND POSITIONING SYSTEMS AND METHODS

CROSS-REFERENCE TO RELATED APPLICATIONS

This application claims the benefit of priority under 35 U.S.C. § 119 to U.S. Provisional Patent Application No. 63/045,501, filed Jun. 29, 2020, which is hereby incorporated by reference herein in its entirety.

BACKGROUND

Seismic or other operations performed on a piece of earth can identify characteristics or features of or on the analyzed piece of earth.

SUMMARY

At least one aspect of the present disclosure is directed to a seismic data acquisition positioning apparatus. The seismic data acquisition positioning apparatus can include a seismic data acquisition unit. The seismic data acquisition unit can include a case having an internal compartment. The seismic data acquisition unit can include a power source, a clock, a seismic data recorder, a control unit, and at least one sensor disposed within the case. The seismic data acquisition positioning apparatus can include a hanging unit including a beacon unit. The seismic data acquisition positioning apparatus can include a connector having a first end coupled with the seismic data acquisition unit and having a second end coupled with the hanging unit. The connector can pivot about the first end of the connector.

Another aspect of the present disclosure is directed to a method. The method can include providing a seismic data acquisition positioning apparatus including a seismic data acquisition unit, a hanging unit, and a retrieval unit. The seismic data acquisition unit can include a case having an internal compartment. The seismic data acquisition unit can include a power source, a clock, a seismic data recorder, a control unit, and at least one sensor disposed within the case. The method can include providing the hanging unit including a beacon unit. The method can include coupling a connector having a first end with the seismic data acquisition unit and coupling the connector having a second end with the hanging unit. The method can include pivoting the connector about the first end of the connector.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIG. 6A illustrates a seismic data acquisition positioning apparatus, according to an example implementation.

Like reference numbers and designations in the various drawings indicate like elements.

DETAILED DESCRIPTION

Following below are more detailed descriptions of various concepts related to, and implementations of, methods, apparatuses, and systems for positioning seismic data acquisition units. The various concepts introduced above and discussed in greater detail below may be implemented in any of a number of ways, as the described concepts are not limited to any particular manner of implementation. Examples of specific implementations and applications are provided primarily for illustrative purposes.

A seismic data acquisition system and survey can acquire seismic data relating to subsurface features, such as lithological formations or fluid layers that may indicate the presence of hydrocarbons, minerals or other elements. An acoustic signal can penetrate the surface of the earth. The acoustic signal can reflect, refract, or diffract off of subsurface lithological formations. The reflected, refracted, or diffracted acoustic signals can be acquired, analyzed, and interpreted to indicate physical characteristics of, for example, the lithological formations such as the presence of hydrocarbons. The reflected, refracted, or diffracted acoustic signals can be received by seismic data acquisition units. It can be challenging to efficiently deploy the seismic data acquisition units such that the seismic data acquisition units are positioned in a target location, with a target orientation, and with a suitable retrieval mechanism. Additionally, confidence that seismic data acquisition unit can be retrieved and knowledge regarding the ocean bottom can improve seismic surveys. Inefficiencies related to increased complexity and survey time can increase the operating cost of these surveys. Systems and methods of the present disclosure can solve these and other problems associated with positioning seismic data acquisition units.

Figure 1A:
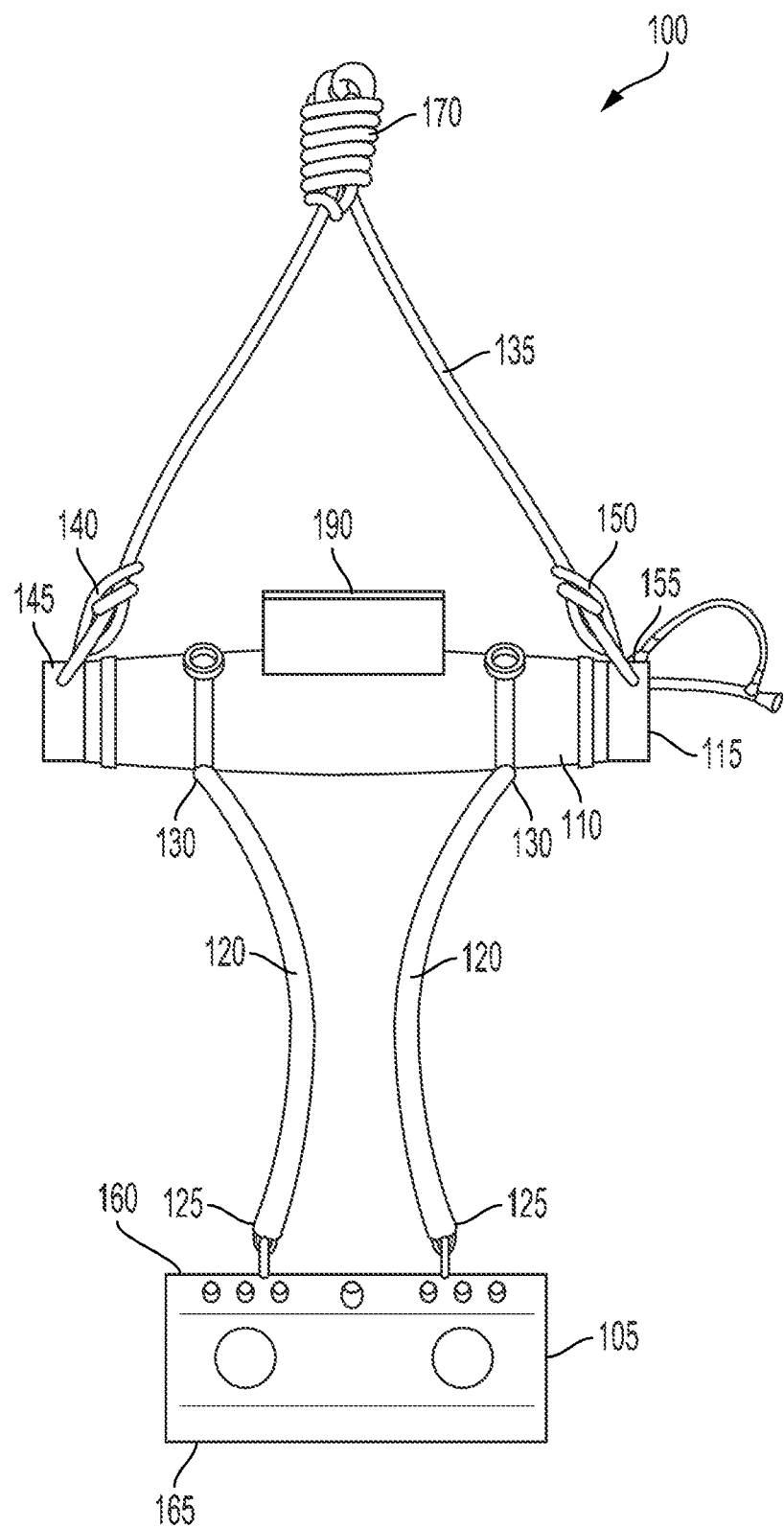
FIG. 1A illustrates a seismic data acquisition positioning apparatus, according to an example implementation.

FIG. 1A illustrates a seismic data acquisition positioning apparatus 100 (e.g., positioning apparatus). The seismic data acquisition positioning apparatus 100 can be non-buoyant in naturally occurring bodies of water (e.g., oceans, lakes, intertidal regions, etc.). The seismic data acquisition positioning apparatus 100 can be used for acquiring data to indicate the presence of hydrocarbons, minerals, or other elements. The seismic data acquisition positioning apparatus 100 can be used for $CO_2$ monitoring and sequestration, mineral exploration, subsurface mapping, and ocean bottom construction and subsurface analysis.

The seismic data acquisition positioning apparatus 100 can include a seismic data acquisition unit 105 (e.g., node, seismic node, seismic data acquisition node, etc.). The seismic data acquisition unit 105 can have a first density. The seismic data acquisition unit 105 can include a case (e.g., bracket) having an internal compartment (e.g., cavity, void, chamber, pocket, etc.). The case can include holes such that water is configured to flow through the case of the seismic data acquisition unit 105. The seismic data acquisition unit 105 can include one or more components, such as a sensor (e.g., geophone, hydrophone, seismic sensor, micro-electromechanical systems (MEMS), accelerometer, fiber optic sensor, etc.), clock, power source, memory, high speed recorder, seismic recorder, a control unit (e.g., processor), accelerometer, transducer, transmitter, or wireless transmitter. The power source, clock, seismic data recorder, control unit, and at least one sensor can be disposed within the case. The seismic data acquisition unit 105 can have a first side 160. The first side 160 can be referred to as a top side. The seismic data acquisition unit 105 can have a second side 165. The second side 165 can be referred to as a bottom side. The seismic data acquisition unit 105 can couple with a seabed (e.g., seafloor, sea floor, ocean floor, etc.) via the second side 165 of the seismic data acquisition unit 105 (e.g., bottom side of the seismic data acquisition unit 105). The seismic data acquisition unit 105 can be in contact with or embedded in the seabed. The seismic data acquisition unit 105 can include a transponder.

The seismic data acquisition unit 105 can have a negative buoyancy in water (e.g., seawater, freshwater, etc.). The seismic data acquisition unit 105 can have a first buoyancy in water. The surfaces of the seismic data acquisition unit 105 can be circular, rectangular, oval, octagonal, pentagonal, polygonal, combinations of these shapes, or have another shape that facilitates seismic data acquisition. The seismic data acquisition unit 105 can have a cylindrical shape. The case of the seismic data acquisition unit 105 can have an elongated cylindrical shape. The seismic data acquisition unit 105 can have a length in a range of 5 inches to 15 inches, for example, 10 inches. The seismic data acquisition unit 105 can have a width in a range of 2 inches to 6 inches, for example, 4 inches. The seismic data acquisition unit 105 can have a depth in a range of 1 inch to 5 inches, for example, 3 inches. The seismic data acquisition unit 105 can have a rectangular shape. The seismic data acquisition unit 105 can have a disk or puck shape. The seismic data acquisition unit 105 can have a diameter in a range of 10 inches to 20 inches, for example, 15 inches. The seismic data acquisition unit 105 can have a height of 3 inches to 9 inches, for example, 6 inches.

The seismic data acquisition positioning apparatus 100 can include a hanging unit 110 (e.g., hanging kit, pinger, pinger assembly, etc.). The hanging unit 110 can include one or more components, such as a battery and a case. The hanging unit 110 can include a beacon unit 115 (e.g., sonar component, beacon, acoustic beacon, optical beacon, sonar pinger, etc.). The beacon unit 115 can include electronics configured to transmit a signal (e.g., acoustic signal, optical signal, etc.). The beacon unit 115 can initiate an acoustic transmission. The beacon unit 115 can include an antenna. The beacon unit 115 can be configured to transmit a location of the seismic data acquisition unit 105. The beacon unit 115 can be configured to indicate a location of the seismic data acquisition unit 105 in transit through the water column or on a seabed. For example, the beacon unit 115 can indicate and transmit the GPS coordinates of the seismic data acquisition unit 105. The beacon unit 115 can transmit heading information from a transducer or transponder. The pinger can be located in the water. The transponder can be located in the air. The pinger can include an extension to transmit a signal above the surface of the water. The beacon unit 115 can be pinged periodically to transmit the location of the seismic data acquisition unit 105. The beacon unit 115 can be electronically coupled with the seismic data acquisition unit 105. For example, the beacon unit 115 can draw power from the seismic data acquisition unit 105. The beacon unit 115 can be given operational commands from the seismic data acquisition unit 105. The beacon unit 115 can have an internal battery. The beacon unit 115 can have transmitting and receiving capabilities. The beacon unit 115 can be incorporated into the seismic data acquisition unit 105. The hanging unit 110 can include a dense unit at the bottom of the hanging unit 110.

The hanging unit 110 can include a buoyant unit 190 (e.g., foam, buoyant foam, plastic, plastic with air bubbles, closed cell foam, open cell foam, wood, air cavity element, bladder unit, buoyant non-compressible material, or a combination thereof, etc.). For example, the buoyant unit 190 can be configured to adjust the buoyancy of the hanging unit 110. The buoyant unit 190 can adjust the amount of buoyant force (e.g., lift) applied to the hanging unit 110. The buoyant unit 190 can adjust the location and/or distribution of the force applied to the hanging unit 110 across the hanging unit 110. The buoyant unit 190 can adjust the buoyancy of the hanging unit 110. The buoyant unit 190 can be coupled with the beacon unit 115. For example, the buoyant unit 190 can be attached to, adhered to, or incorporated into the beacon unit 115. The buoyant unit 190 can be integral with or integrated into the beacon unit 115. The buoyant unit 190 can be directly coupled with the beacon unit 115. For example, the buoyant unit 190 can be mounted on the beacon unit 115. The buoyant unit 190 can be indirectly coupled with the beacon unit 115. For example, the buoyant unit 190 can be coupled with the beacon unit 115 via a cable, rope, or a case. The buoyant unit 190 can be buoyant in water (e.g., seawater, freshwater, etc.). The buoyant unit 190 can be incorporated into the beacon unit 115. For example, the beacon unit 115 can be manufactured from the buoyant unit 190 to achieve desired structural and buoyancy design criteria. The buoyant unit 190 can be buoyant in naturally occurring bodies of water (e.g., oceans, lakes, intertidal regions, etc.).

The hanging unit 110 can have a second density. The second density can be less than the first density. For example, the density of the hanging unit 110 can be less than the density of the seismic data acquisition unit 105. The second density can be equal to the first density. The second density can be greater than the first density. The density of the beacon unit 115 and the buoyant unit 190 combined can be less than the density of the seismic data acquisition unit 105. The hanging unit 110 can include a non-buoyant hanging unit 110. For example, the hanging unit 110 can have neutral buoyancy in water (e.g., seawater, freshwater, etc.). The hanging unit 110 can have a second buoyancy. The second buoyancy can be greater than the first buoyancy. For example, the buoyancy of the hanging unit 110 can be greater than the buoyancy of the seismic data acquisition unit 105.

The hanging unit 110 can have a shape profile configured to hinder a lateral movement of the seismic data acquisition unit 105. For example, the hanging unit 110 can have cylindrical shape, an elongated shape, or an oblong shape. The hanging unit 110 can have a plate shape or an inverted cone shape. The hanging unit 110 can have a shape that increases drag of the seismic data acquisition positioning apparatus 100. The shape of the hanging unit 110 can cause the seismic data acquisition positioning apparatus 100 to resist lateral movement when the seismic data acquisition positioning apparatus 100 is descending in a body of water. The shape of the hanging unit 110 can control (e.g., determine, manage, regulate, minimize, hinder, direct, assist, support, effect, impact, diminish, impede, etc.) lateral movement when the seismic data acquisition positioning apparatus 100 is descending in a body of water. The hanging unit 110 can provide consistent (e.g., repeatable, reliable, etc.) lateral movement of the seismic data acquisition unit 105. The shape of the hanging unit 110 can control the descent of the seismic data acquisition unit 105 to the seabed. The hanging unit 110 can have a shape profile configured to make the seismic data acquisition positioning apparatus 100 resistant to flipping and turning while the seismic data acquisition positioning apparatus 100 is descending in the body of water. The hanging unit 110 can have hydrodynamic stability. The hanging unit 110 can add drag to the seismic data acquisition positioning apparatus 100 as the seismic data acquisition positioning apparatus 100 is descending in the body of water. The hanging unit 110 can have a hydrodynamic shape to create drag during descent of the seismic data acquisition positioning apparatus 100. Each of the components of the seismic data acquisition positioning apparatus 100 can contribute to how the seismic data acquisition positioning apparatus 100 descends to the seafloor. The hanging unit 110 can include a drogue to control the descent of the seismic data acquisition positioning apparatus 100. The drogue can include a device configured to reduce speed or improve stability. The drogue can include a device configured to reduce speed or improve stability of the seismic data acquisition positioning apparatus 100.

The seismic data acquisition positioning apparatus 100 can include a connector 120 (e.g., hose, tube, harness, H-shaped harness, lanyard, tubing, plastic tubing, semi-rigid cable, etc.). The connector 120 can include a rope (e.g., stress member) running through a center of the connector 120. The connector 120 can include a rope connected to the end of the connector 120. The connector 120 can reduce the possibility of the rope tangling during descent of the seismic data acquisition positioning apparatus 100. The rope can be made of, for example, nylon, Kevlar, high-modulus polyethylene (HMPE), carbon fiber, polyester or polypropylene. The connector 120 can ensure that the hanging unit 110 does not fall on top of the seismic data acquisition unit 105 when the seismic data acquisition unit 105 is on the seafloor. The connector 120 can ensure that the hanging unit 110 does not rest on top of the seismic data acquisition unit 105 when the seismic data acquisition unit 105 is on the seafloor.

The connector 120 can maintain tension between the hanging unit 110 and the seismic data acquisition unit 105. Maintaining tension can be important during deployment when the seismic data acquisition positioning apparatus 100 is descending through the water. The rope can introduce (e.g., generate) slack between the connector 120 and the seismic data acquisition unit 105. Introducing slack can be important when the seismic data acquisition unit 105 is collecting data. For example, the connector 120 and the seismic data acquisition unit 105 can be loosely connected. The connector 120 and the seismic data acquisition unit 105 can be loosely connected on at least one degree of freedom. The connector 120 and the seismic data acquisition unit 105 can rotate along a single axis.

The seismic data acquisition positioning apparatus 100 can include a plurality of connectors (e.g., two connectors, three connectors, four connectors, five connectors, etc.). The connector 120 can have first rigidity. The connector 120 can include a semi-rigid connector. The connector 120 can be configured to pivot about the first end of the connector 120. The connector 120 can have a rigidity such that the hanging unit 110 does not land on the seismic data acquisition unit 105. The connector 120 can include a single connector 120. The connector 120 can have one point of connection with the seismic data acquisition unit 105 and the hanging unit 110. The connector 120 can couple with a T-bar attached to the seismic data acquisition unit 105 and/or the hanging unit 110. The connector 120 can be coupled with the seismic data acquisition unit 105 on a first side 160 of the seismic data acquisition unit 105. The connector 120 can be coupled with the case of the seismic data acquisition unit 105. For example, the hanging unit 110 can be coupled with the case of the seismic data acquisition unit 105 via the connector 120. The connector 120 can be coupled to a mechanical interface between the seismic data acquisition unit 105 and the connector 120. The seismic data acquisition unit 105 can couple with a seabed via a second side 165 of the seismic data acquisition unit 105.

The connector 120 can couple with the seismic data acquisition unit 105 via a rope (e.g., nylon rope, Kevlar, HMPE, carbon fiber, polyester, polypropylene etc.). The connector 120 can have a length in a range of 1 meter to 3 meters, for example, 2 meters. The connector 120 can have a length such that the hanging unit 110 does not land on the seismic data acquisition unit 105. Because the seismic data acquisition unit 105 can sink into mud after deployment, the connector 120 can introduce distance between the seismic data acquisition unit 105 and the beacon unit 115. The hanging unit 110 can be directly coupled to the seismic data acquisition unit 105 such that the seismic data acquisition positioning apparatus 100 does not have a connector 120. The connector 120 can include a stress member. The stress member can withstand the stress of the seismic data acquisition positioning apparatus 100 being retrieved from the seafloor.

The connector 120 can have a first end 125 (e.g., first end 125 of the connector 120). The first end 125 of the connector 120 can be coupled with the seismic data acquisition unit 105. The first end 125 of the connector 120 can be directly coupled with the seismic data acquisition unit 105. For example, the first end 125 of the connector 120 can be mounted on the seismic data acquisition unit 105. The first end 125 of the connector 120 can be mounted on a case of the seismic data acquisition unit 105. The first end 125 of the connector 120 can be indirectly coupled with the seismic data acquisition unit 105. For example, the first end 125 of the connector 120 can be coupled with the seismic data acquisition unit 105 via a cable, rope, hose clamp, or other attachment mechanism. The first end 125 of the connector 120 can be coupled with the seismic data acquisition unit 105 through a connection that isolates vibrations. For example, the connection can include a rubber connector or poor vibration conductors. The first end 125 of the connector 120 can be coupled with the seismic data acquisition unit 105 via a rope attached to a ring disposed on the seismic data acquisition unit 105. Rope can be connected at the end of the connector 120 and does not have to run through the center of the connector 120.

The connector 120 can have a second end 130 (e.g., second end 130 of the connector 120). The second end 130 of the connector 120 can be coupled with the hanging unit 110. The second end 130 of the connector 120 can be directly coupled with the hanging unit 110. For example, the second end 130 of the connector 120 can be mounted to the hanging unit 110. The second end 130 of the connector 120 can be mounted to the beacon unit 115. The second end 130 of the connector 120 can be indirectly coupled with the hanging unit 110. For example, the second end 130 of the connector 120 can be coupled with the hanging unit 110 via a cable, rope, hose clamp, or other attachment mechanism. The second end 130 of the connector 120 can be coupled with the hanging unit 110 through a connection that isolates vibrations. For example, the connection can include a rubber connector or poor vibration conductors. The second end 130 of the connector 120 can be coupled to the center of the hanging unit 110.

The connector 120 can include a first connector. The first connector can have a first end coupled with the seismic data acquisition unit 105. The first connector can have a second end coupled with the hanging unit 110. The first connector can be coupled with the seismic data acquisition unit 105 on the first side 160 of the seismic data acquisition unit 105 (e.g., top side of the seismic data acquisition unit 105). For example, the first connector can be directly coupled with the top side of the seismic data acquisition unit 105. The first connector can be indirectly coupled with the top side of the seismic data acquisition unit 105. For example, the first connector can be coupled with the top side of the seismic data acquisition unit 105 via a first nylon rope. The first nylon rope can be attached to a ring (e.g., metal ring, polymer ring, etc.) located on a case of the seismic data acquisition unit 105.

The connector can include a second connector. The second connector can have a first end coupled with the seismic data acquisition unit 105. The second connector can have a second end coupled with the hanging unit 110. The second connector can be coupled with the seismic data acquisition unit 105 on the first side 160 of the seismic data acquisition unit 105. For example, the second connector can be directly coupled with the top side of the seismic data acquisition unit 105. The second connector can be indirectly coupled with the top side of the seismic data acquisition unit 105. For example, the second connector can be coupled with the top side of the seismic data acquisition unit 105 via a second nylon rope. The second nylon rope can be attached to a ring (e.g., metal ring, polymer ring, etc.) located on a case of the seismic data acquisition unit 105. The second nylon rope can be the same rope as the first nylon rope. The second nylon rope can be a different rope than the first nylon rope.

The first end of the first connector and the first end of the second connector can be symmetrically disposed about the seismic data acquisition unit 105. The first end of the first connector and the first end of the second connector can be asymmetrically disposed about the seismic data acquisition unit 105. The second end of the first connector and the second end of the second connector can be symmetrically disposed about the hanging unit 110. The second end of the first connector and the second end of the second connector can be asymmetrically disposed about the hanging unit 110. The first end of the first connector and the first end of the second connector can be equidistant from a centerline of the seismic data acquisition unit 105. The second end of the first connector and the second end of the second connector can be equidistant from a centerline of the hanging unit 110. The first connector and the second connector can be spaced a distance apart. The first connector and the second connector can be connected to the seismic data acquisition unit 105 along a longitudinal axis of the seismic data acquisition unit 105. The first connector and the second connector can be connected to the seismic data acquisition unit 105 along a longitudinal axis of the hanging unit 110. The first connector can be coupled with the second connector via a cross brace unit (e.g., cross bar unit). The cross brace unit can minimize or prevent the seismic data acquisition positioning apparatus 100 from twisting during descent of the seismic data acquisition positioning apparatus 100.

The seismic data acquisition positioning apparatus 100 can include a retrieval unit 135 (e.g., retrieval kit). The retrieval unit 135 can have a third density. The third density can be less than the second density. The third density can be greater than the second density. The third density can be less than the first density. The third density can be less than the second density. For example, the density of the retrieval unit 135 can be less than the density of the hanging unit 110. The density of the retrieval unit 135 can be less than the density of the seismic data acquisition unit 105. The retrieval unit 135 can have a positive buoyancy in water (e.g., seawater, freshwater, etc.). For example, the retrieval unit 135 can float in water. The retrieval unit 135 can have a third buoyancy. The third buoyancy can be greater than the second buoyancy. For example, the buoyancy of the retrieval unit 135 can be greater than the buoyancy of the hanging unit 110. The third buoyancy can be greater than the first buoyancy. For example, the buoyancy of the retrieval unit 135 can be greater than the buoyancy of the seismic data acquisition unit 105. The retrieval unit 135 can include the beacon unit 115. For example, the beacon unit 115 can be coupled with or incorporated into the retrieval unit 135. For example, the beacon unit 115 can be coupled with the retrieval unit 135 to ensure that the antenna not located in the seafloor (e.g., in the mud) when the seismic data acquisition positioning apparatus 100 is disposed on the seafloor.

The retrieval unit 135 can include a rope. For example, the retrieval unit 135 can include a buoyant rope, cable, line, lanyard, or recovery line. The retrieval unit 135 can include a buoyant knot 170 (e.g., monkey's fist, monkey paw, knot, buoy, etc.). The buoyant knot 170 can include a floatation device or bobber. The floatation device can have any general shape. For example, the floatation device can have a cube shape, cone shape, sphere shape, cylinder shape, brick shape, block shape, plate shape, bowl shape, or ring shape.

The floatation device can have a solid form. he floatation device can have one or more cavities, holes, slots, barbs, arms, fingers or protrusions designed to facilitate ocean bottom retrieval. The buoyant knot 170 can be rigid or flexible. The buoyant knot 170 can be made of buoyant plastic, foam, or other materials. The buoyant knot 170 can include a buoyant element. For example, the buoyant knot 170 can float in water (e.g., seawater, freshwater, etc.)

The retrieval unit 135 can have a first end (e.g., first end of the retrieval unit 140). The first end of the retrieval unit 140 can be coupled with a first portion of the hanging unit 145. The retrieval unit 135 can have having a second end (e.g., second end of the retrieval unit 150). The second end of the retrieval unit 150 can be coupled with a second portion of the hanging unit 155. For example, the retrieval unit 135 can have a first end tied to the first portion of the hanging unit 145. The retrieval unit 135 can have a second end tied to the second portion of the hanging unit 155. The retrieval unit 135 can have the first end and the second end disposed symmetrically about the hanging unit 110. The retrieval unit 135 can have the first end and the second end disposed asymmetrically about the hanging unit 110. The retrieval unit 135 can have the first end and the second end coupled to a top portion of the hanging unit 110. The retrieval unit 135 can include a floating cable, a floatation device, a ring, a toroid, or ball (e.g., spherical buoyancy unit). The seismic data acquisition positioning apparatus 100 including the seismic data acquisition unit 105, the hanging unit 110, and the retrieval unit 135 can be non-buoyant. The retrieval unit 135 can have a second rigidity. The first rigidity can be greater than the second rigidity. For example, the connector 120 can have a rigidity greater than the rigidity of the retrieval unit 135. The first connector can have a rigidity greater than the rigidity of the retrieval unit 135. The second connector can have a rigidity greater than the rigidity of the retrieval unit 135. The first connector and the second connector can be pliable.

The retrieval unit 135 can be used to identify, locate, and/or pick up the seismic data acquisition unit 105. The seismic data acquisition unit 105 can be retrieved by a vessel (e.g., boat, crewed boat, etc.). The seismic data acquisition unit 105 can be retrieved by an air drone. The seismic data acquisition unit 105 can be retrieved by a marine drone. The retrieval unit 135 can include a quick connection. For example, the quick connection can coupled with the retrieval unit 135 and a drone. The retrieval unit 135 can include an extension to be coupled with the drone. The extension can be above the surface of the water. The extension can be above the surface of the water such that the drone does not get hit by surface waves. The drones can be deployed and/or retrieved from a platform (e.g., production rig). The drones can be deployed and/or retrieved from a vessel. The drones can be deployed and/or retrieved from a vessel-platform hybrid. For example, the vessel-platform hybrid can include a vessel that can transform into a platform.

The seismic data acquisition positioning apparatus 100 can include a surface buoy. The surface buoy can mark the location of the seismic data acquisition unit 105 below. The surface buoy can facilitate finding the submerged seismic data acquisition unit 105. The seismic data acquisition positioning apparatus 100 can include one or more signal devices (e.g., pinger, light, AIS transponder, iridium GPS, radio, radar, etc.). The one or more signal devices can provide the location of the seismic data acquisition unit 105. The seismic data acquisition positioning apparatus 100 can be lifted completely from the seafloor such that there is no debris left on the seafloor or ocean when the seismic data acquisition positioning apparatus 100 is retrieved. It can be environmentally beneficial that there is no debris left on the seafloor.

Figure 1B:
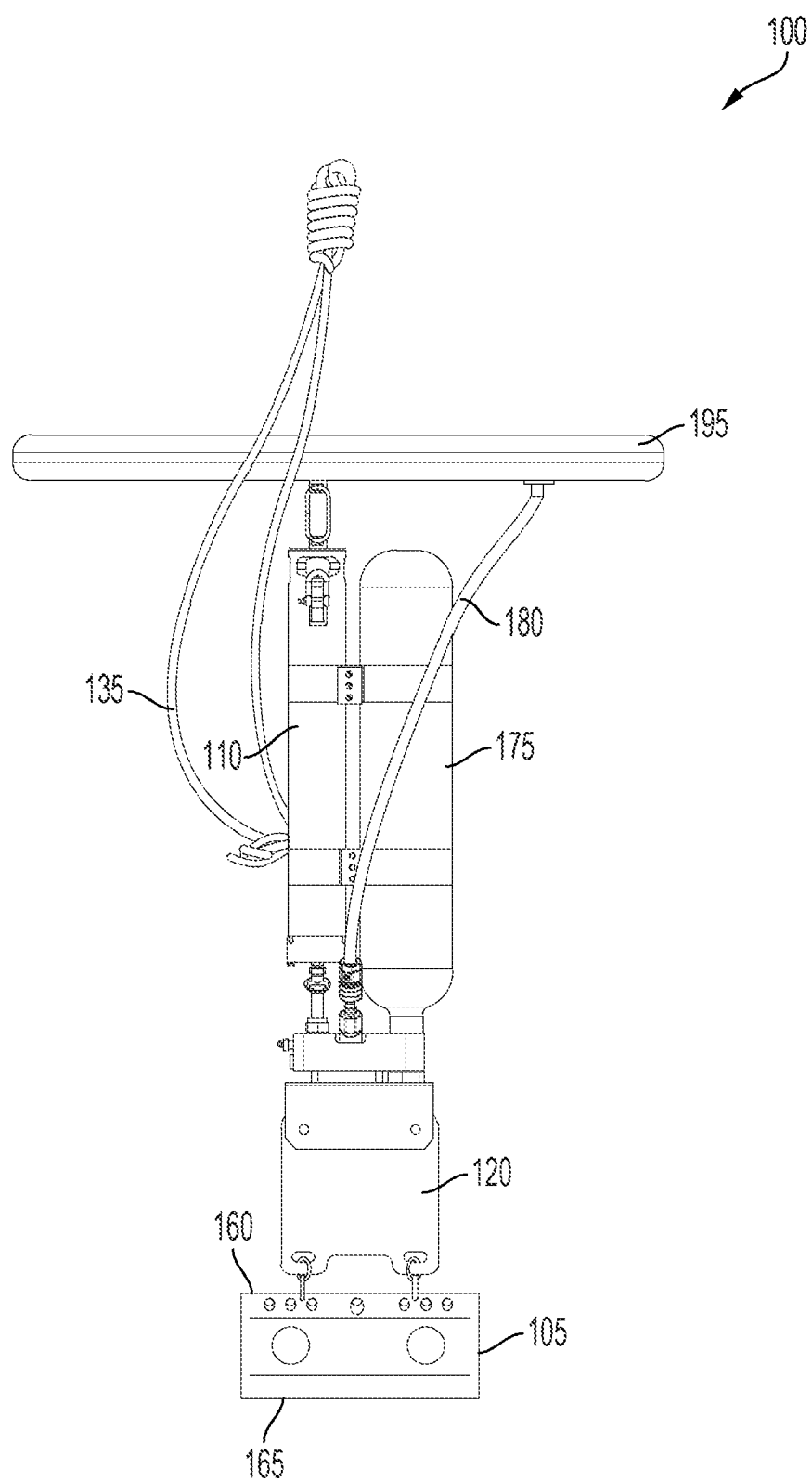
FIG. 1B illustrates a seismic data acquisition positioning apparatus, according to an example implementation.

FIG. 1B illustrates a seismic data acquisition positioning apparatus 100. The seismic data acquisition positioning apparatus 100 can include the seismic data acquisition unit 105. The seismic data acquisition unit 105 can include the case having the wall defining the internal compartment. The seismic data acquisition unit 105 can include a power source, a clock, a seismic data recorder, a control unit, and at least one sensor disposed within the case. The seismic data acquisition unit 105 can have the first side 160. The seismic data acquisition unit 105 can have the second side 165.

The seismic data acquisition positioning apparatus 100 can include the retrieval unit 135. The retrieval unit 135 can have a first density. The retrieval unit 135 can have an end coupled with the hanging unit 110. The retrieval unit 135 can have a first end coupled with a first portion of the hanging unit 145. The retrieval unit 135 can include a balloon 195 (e.g., inflatable balloon, rescue balloon, retrieval balloon, lifting balloon, lift bag, etc.). An acoustic pinger can set off a trigger device to inflate the balloon 195. The acoustic pinger can set off the trigger device to inflate the balloon 195 and cause the balloon 195, seismic data acquisition unit 105, and hanging unit 110 to float (e.g., rise) to the surface of the body of water. The acoustic pinger can set off the trigger device to inflate the balloon 195 and cause the seismic data acquisition positioning apparatus 100 to float (e.g., rise) to the surface of the body of water. The balloon 195 can be triggered to inflate by a sonar signal. The balloon 195 can be triggered to inflate by a chemical reaction. A mechanism can trigger the balloon 195 to inflate. A mechanism can actuate the balloon 195. A mechanism can communicate with the balloon 195. The balloon 195 can cause the seismic data acquisition unit 105 to float. The size of the balloon 195 can be dictated by the size of the seismic data acquisition unit 105 and the deployment depth (e.g., depth at which the seismic data acquisition unit 105 settles on the seafloor). The balloon 195 can be inflated with compressed gas. The balloon 195 can be inflated via a chemical reaction that produces gas. The balloon 195 can be inflated with $N_2$. The balloon 195 can be inflated with $N_2$ generated by the decomposition of sodium azide ($NaN_3$). The balloon 195 can be inflated with $H_2$ and/or $O_2$ generated from the decomposition of water ($H_2O$). The balloon 195 can be lifted to the surface of the water by powered propulsion.

The seismic data acquisition positioning apparatus 100 can include a plurality of retrieval units 135. For example, the seismic data acquisition positioning apparatus 100 can include the rope (e.g., buoyant rope) and the balloon 195. The seismic data acquisition positioning apparatus 100 can include the buoyant knot 170 and the balloon 195. The seismic data acquisition positioning apparatus 100 can include a plurality of retrieval units 135 for redundancy. For example, if the balloon 195 does not inflate, a remotely operated vehicle can retrieve the seismic data acquisition unit 105 via the buoyant knot 170 or the rope.

The seismic data acquisition positioning apparatus 100 can include the hanging unit 110. The hanging unit 110 can include the beacon unit 115. The hanging unit 110 can include a pinger. The hanging unit 110 can include a gas canister 175 (e.g., pressurized gas canister, air canister, pressurized air canister, gas bottle, gas vessel, etc.). The gas canister 175 can be filled with pressurized gas. For example, the gas canister 175 can be filled with $CO_2$, $N_2$, $O_2$, or $H_2$. The gas canister 175 can be made of metal or a composite material. The gas canister 175 can be metallic. The gas canister 175 can be configured to inflate the balloon 195. A receiver can receive a ping from a transducer to cause the gas canister 175 to inflate the balloon 195. The receiver can cause a valve coupled with the gas canister 175 to open. The receiver can cause the valve coupled with the gas canister 175 to open responsive to receiving a ping. The valve can be opened by a remote release function. In response to the valve opening, air (e.g., pressurized air) can travel through a hose 180 (e.g., tube) into the balloon 195. The hose 180 can couple the balloon 195 with the hanging unit 110. The gas canister 175 can be coupled with the balloon 195. The gas canister 175 can be coupled with the balloon 195 via the hose 180. The gas canister 175 can fill the balloon 195 with gas. The hanging unit 110 can be programmable. For example, the hanging unit 110 can receive multiple instructions. The hanging unit 110 can receive information from the seismic data acquisition unit 105. For example, the information can include water quality, currents while the seismic data acquisition unit 105 is dropping, environmental information, salinity, depth, temperature, or dissolved oxygen. The hanging unit 110 can have a second density. The second density can be less than the first density. For example, the density of the hanging unit 110 can be less than the density of the seismic data acquisition unit 105. The second density can be equal to the first density. The second density can be greater than the first density. The balloon 195 can be coupled with the hanging unit 110. For example, the balloon 195 can be coupled with the hanging unit 110 via a clip or carabiner.

The seismic data acquisition positioning apparatus 100 can include the connector 120 having a first end coupled with the seismic data acquisition unit 105 and having a second end coupled with the hanging unit 110. The connector 120 can include a third end coupled with the seismic data acquisition unit 105. The connector 120 can include a fourth end coupled with the hanging unit 110. The connector 120 can pivot about a pivot point. For example, the connector 120 can be configured to pivot about the first end of the connector 120. The pivot point can have little to no friction. The connector 120 can include a pivoting member (e.g., pivoting leg). The connector 120 can have a degree of rigidity such that the hanging unit 110 does not collapse on top of the seismic data acquisition unit 105. The connector 120 can separate the seismic data acquisition unit 105 from the hanging unit 110. The connector 120 can cause the hanging unit 110 to settle on the ground adjacent to the seismic data acquisition unit 105. The connector 120 can be rigid enough to separate the seismic data acquisition unit 105 from the hanging unit 110 while being flexible enough to isolate vibrations and noise caused by the hanging unit 110 from the seismic data acquisition unit 105. For example, water currents can act on the hanging unit 110 to cause vibrations that are isolated from the seismic data acquisition unit 105 by the connector 120. Water currents can act on the pinger to cause vibrations that are isolated from the seismic data acquisition unit 105 by the connector 120. Water currents can act on the gas canister 175 to cause vibrations that are isolated from the seismic data acquisition unit 105 by the connector 120. Water currents can act on the balloon 195 to cause vibrations that are isolated from the seismic data acquisition unit 105 by the connector 120. The connector 120 can seismically isolate the seismic data acquisition unit 105 from the hanging unit 110. The connector 120 can seismically isolate the seismic data acquisition unit 105 from the retrieval unit 135.

The connector 120 can include a trapezoidal element. The connector 120 can include a triangular element. The connector 120 can include a square element. The connector 120 can include a square element with protrusions. The connector 120 can seismically decouple the seismic data acquisition unit 105 from the hanging unit 110. The connector 120 can be seismically decoupling. For example, vibrations or noise generated by the hanging unit 110 can be isolated from the seismic data acquisition unit 105. Vibrations or noise generated by the hanging unit 110 can be isolated from the retrieval unit 135. The seismic decoupling can be achieved through the composition of the connector 120. For example, the connector 120 can be made of rubber (e.g., stamped rubber, recycled rubber, etc.). The connector 120 can include a flat piece of rubber. The seismic decoupling can be achieved through connections between the connector 120 and the seismic data acquisition unit 105. For example, a soft shackle can couple the connector 120 with the seismic data acquisition unit 105. The seismic decoupling can be achieved through the flexibility and stiffness of the connector 120. The seismic decoupling can be achieved through the degrees of freedom the connector 120 has with respect to the seismic data acquisition unit 105.

The retrieval unit 135 can include a rope (e.g., recovery line). The rope can have a first end. The first end of the rope can be coupled with the balloon 195. The first end of the rope can be coupled with the hanging unit 110. The first end of the rope can be coupled with the pinger. The first end of the rope can be coupled with the gas canister 175. The rope can have a second end. The second end of the rope can be coupled with the balloon 195. The second end of the rope can be coupled with the hanging unit 110. The second end of the rope can be coupled with the pinger. The second end of the rope can be coupled with the gas canister 175. The rope can float above the seismic data acquisition unit 105. The rope can float above the balloon 195. The rope can float above the hanging unit 110. The rope can float above the pinger. The rope can float above the gas canister 175. The rope can be in a loop configuration. The rope can be in a straight configuration. A remotely operated vehicle can retrieve the seismic data acquisition unit 105 via the rope. The seismic data acquisition positioning apparatus 100 can include multiple ropes. The rope can allow the seismic data acquisition unit 105 to be retrieved after the seismic data acquisition unit 105 sinks into sand on the seafloor. The seismic data acquisition positioning apparatus 100 can include an appendage to keep the seismic data acquisition unit 105 from sinking. The seismic data acquisition positioning apparatus 100 can include an appendage that protrudes from the seafloor. The appendage can include a retrieval arm. The appendage can include a retrieval arm that extends above the seafloor.

The seismic data acquisition positioning apparatus 100 can float to the surface of the water. The seismic data acquisition positioning apparatus 100 can self-propel to the surface of the water. The seismic data acquisition positioning apparatus 100 can self-propel to an underwater vehicle. The seismic data acquisition positioning apparatus 100 can return to a base (e.g., distant base). The seismic data acquisition positioning apparatus 100 can self-propel to a local pick-up point. The seismic data acquisition positioning apparatus 100 can self-propel to a drone rendezvous point. The seismic data acquisition positioning apparatus 100 can transmit its position and status (e.g., via sonar, iridium GPS, AIS transponder, light beacon, radar reflector, acoustic transmitter, radio transmitter, etc.)

Figure 1C:
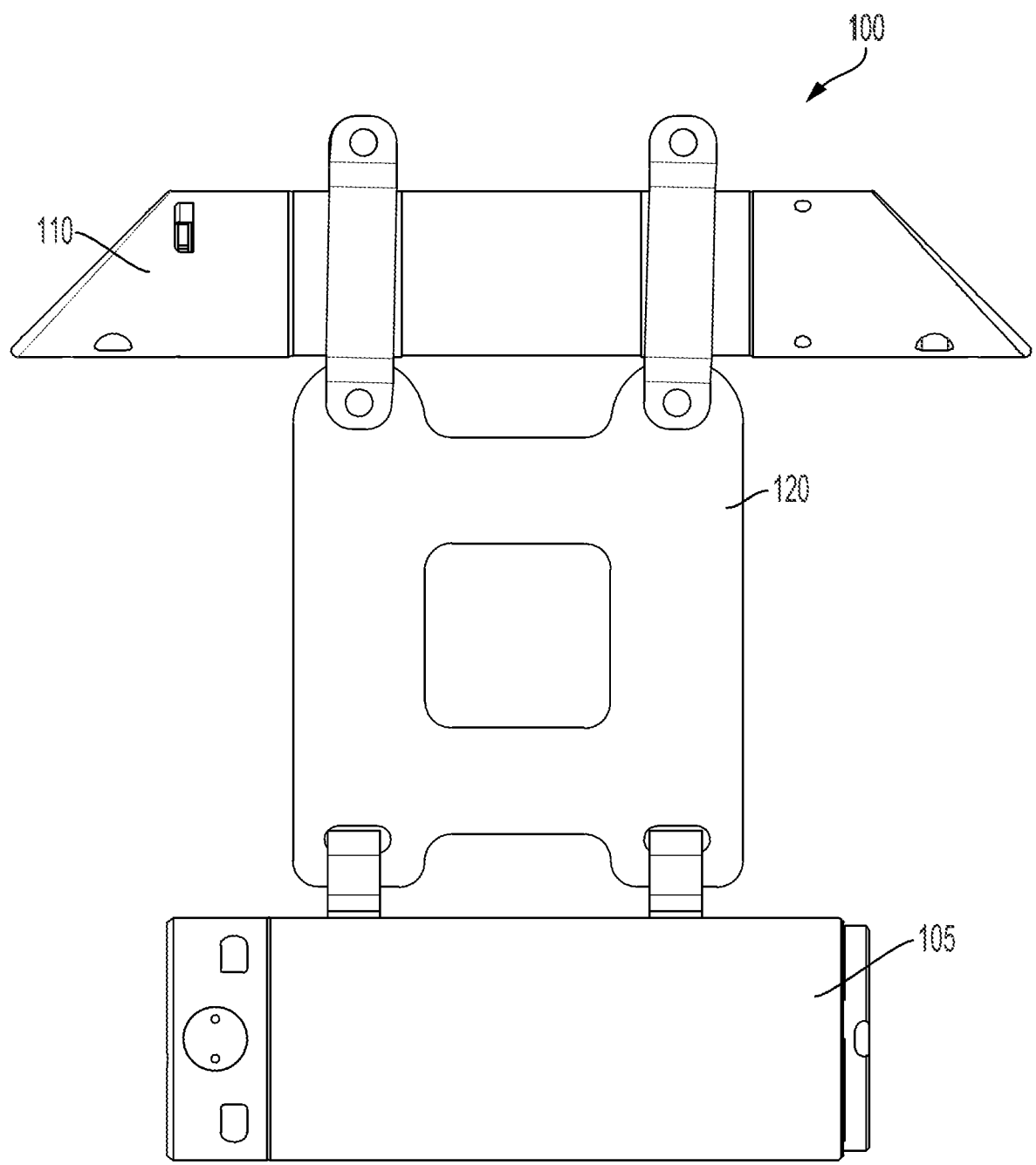
FIG. 1C illustrates a seismic data acquisition positioning apparatus, according to an example implementation.

FIG. 1C illustrates a seismic data acquisition positioning apparatus 100. The seismic data acquisition positioning apparatus 100 can include the seismic data acquisition unit 105. The seismic data acquisition unit 105 can include the case having the wall defining the internal compartment. The seismic data acquisition unit 105 can include a power source, a clock, a seismic data recorder, a control unit, and at least one sensor disposed within the case. The seismic data acquisition positioning apparatus 100 can include the hanging unit 110. The hanging unit 110 can include the beacon unit 115. The seismic data acquisition positioning apparatus 100 can include the connector 120 having a first end coupled with the seismic data acquisition unit 105 and having a second end coupled with the hanging unit 110. The retrieval unit 135 may be absent from the seismic data acquisition positioning apparatus 100. In some surveys, the seafloor can be hard such that the seismic data acquisition unit 105 does not sink into the seafloor. The seismic data acquisition unit 105 can sink into the seafloor if the seafloor is made of mud or silt. The hanging unit 110 can have a shape profile configured to increase drag. The seismic data acquisition positioning apparatus 100 can include a battery-powered fan. The battery-powered fan can position the seismic data acquisition unit 105 at a specific location. The hanging unit 110 can have a shape profile configured to create a disparity in fall rates between the hanging unit 110 and the seismic data acquisition unit 105. The hanging unit 110 can be above the seismic data acquisition unit 105 as the seismic data acquisition positioning apparatus 100 falls through water. The seismic data acquisition unit 105 can be retrieved by a remotely operated vehicle.

Figure 2:
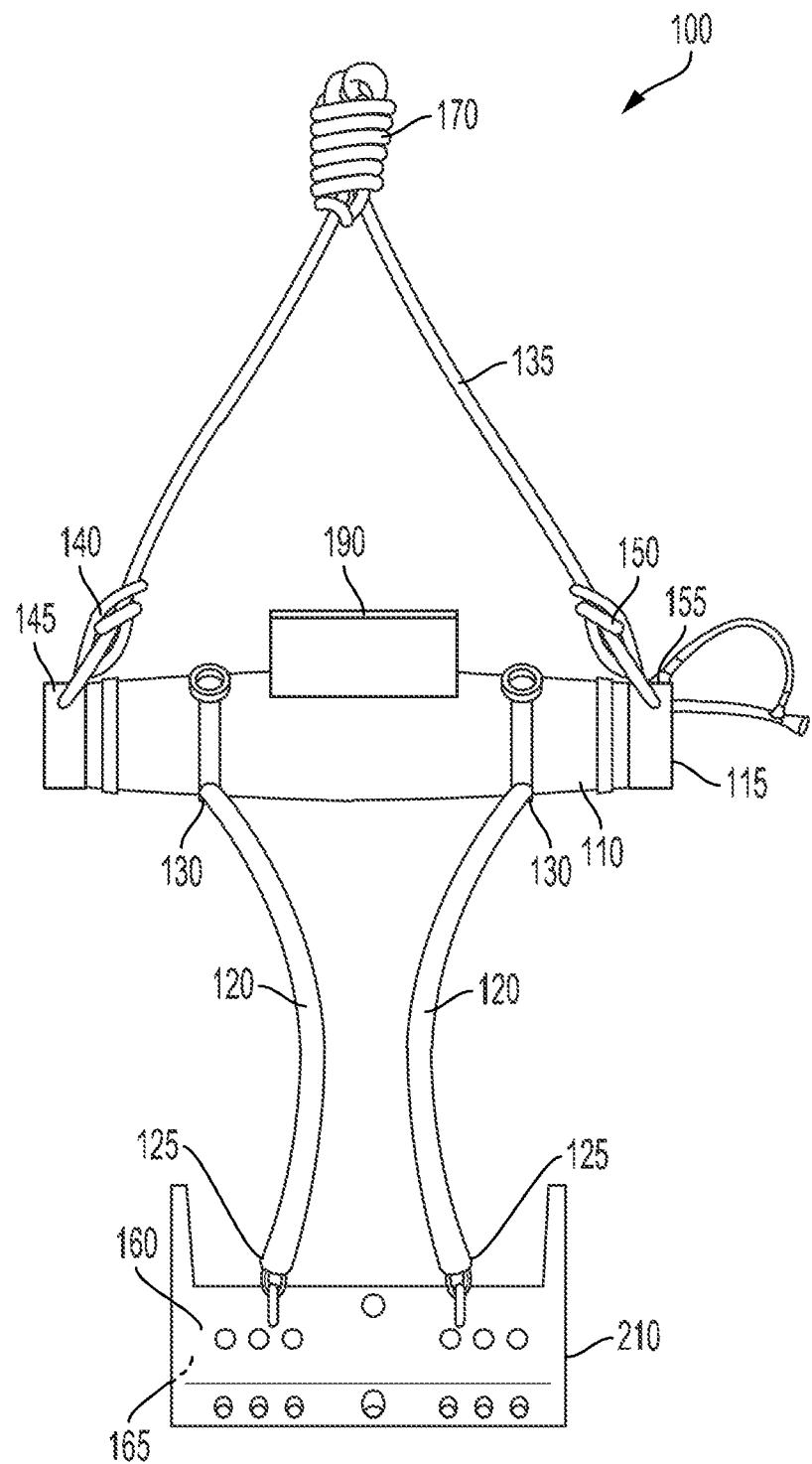
FIG. 2 illustrates a seismic data acquisition positioning apparatus, according to an example implementation.

FIG. 2 illustrates a seismic data acquisition positioning apparatus 100. The seismic data acquisition positioning apparatus 100 can include a case 210 to hold the seismic data acquisition unit 105. The seismic data acquisition positioning apparatus 100 can include the seismic data acquisition unit 105. The seismic data acquisition unit 105 can include the case having the wall defining the internal compartment. The seismic data acquisition unit 105 can include a power source, a clock, a seismic data recorder, a control unit, and at least one sensor disposed within the case. The seismic data acquisition positioning apparatus 100 can include the hanging unit 110. The hanging unit 110 can include the beacon unit 115. The hanging unit 110 can include the buoyant unit 190. The buoyant unit 190 can allow the hanging unit 110 to achieve a target buoyancy. The seismic data acquisition positioning apparatus 100 can include the connector 120 having a first end coupled with the seismic data acquisition unit 105 and having a second end coupled with the hanging unit 110. The seismic data acquisition positioning apparatus 100 can include the retrieval unit 135 having a first end coupled with a first portion of the hanging unit 145 and having a second end coupled with a second portion of the hanging unit 155.

Figure 3A:
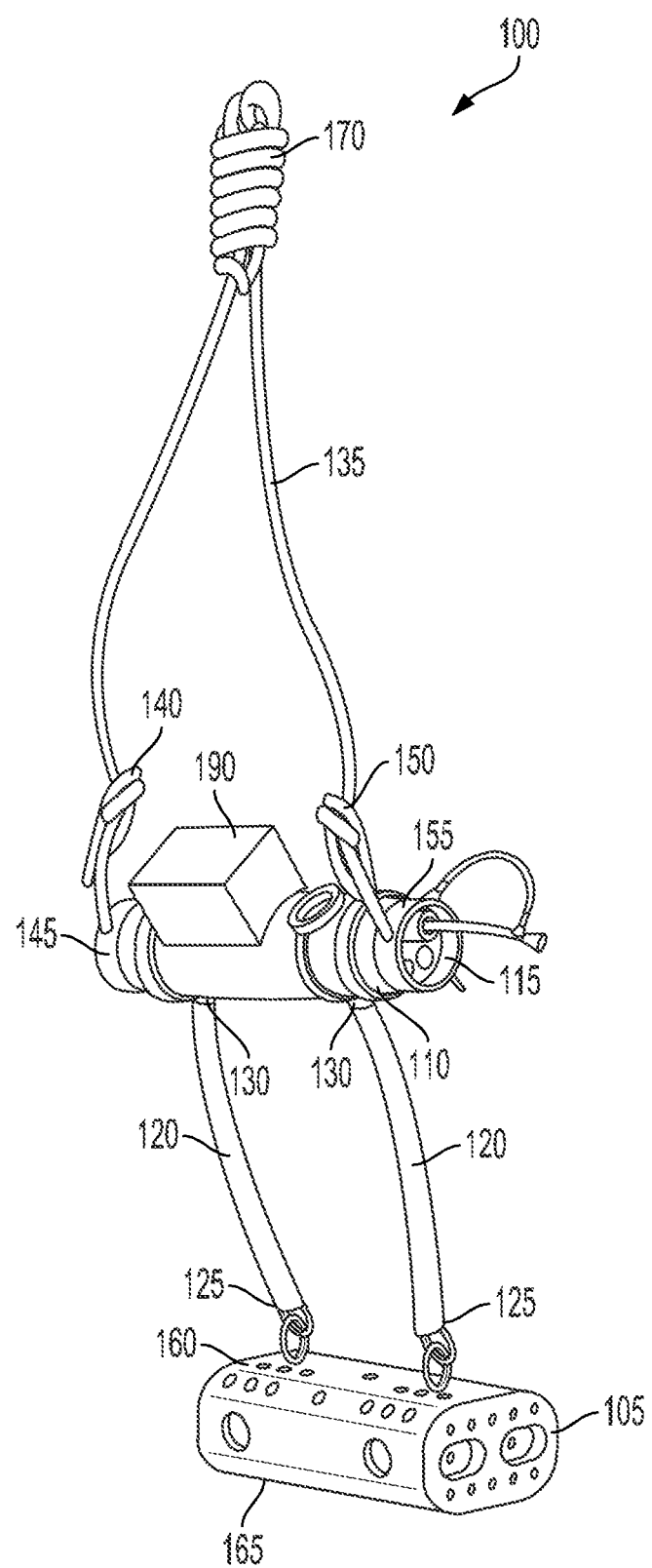
FIG. 3A illustrates a seismic data acquisition positioning apparatus, according to an example implementation.

FIG. 3A illustrates a seismic data acquisition positioning apparatus 100. The seismic data acquisition positioning apparatus 100 can include the seismic data acquisition unit 105. The seismic data acquisition unit 105 can include the case having the wall defining the internal compartment. The seismic data acquisition unit 105 can include a power source, a clock, a seismic data recorder, a control unit, and at least one sensor disposed within the case. The seismic data acquisition positioning apparatus 100 can include the hanging unit 110. The hanging unit 110 can include the beacon unit 115. The hanging unit 110 can include the buoyant unit 190. The buoyant unit 190 can allow the hanging unit 110 to achieve a target buoyancy. The seismic data acquisition positioning apparatus 100 can include the connector 120 having a first end coupled with the seismic data acquisition unit 105 and having a second end coupled with the hanging unit 110. The seismic data acquisition positioning apparatus 100 can include the retrieval unit 135 having a first end coupled with a first portion of the hanging unit 145 and having a second end coupled with a second portion of the hanging unit 155.

Figure 3B:
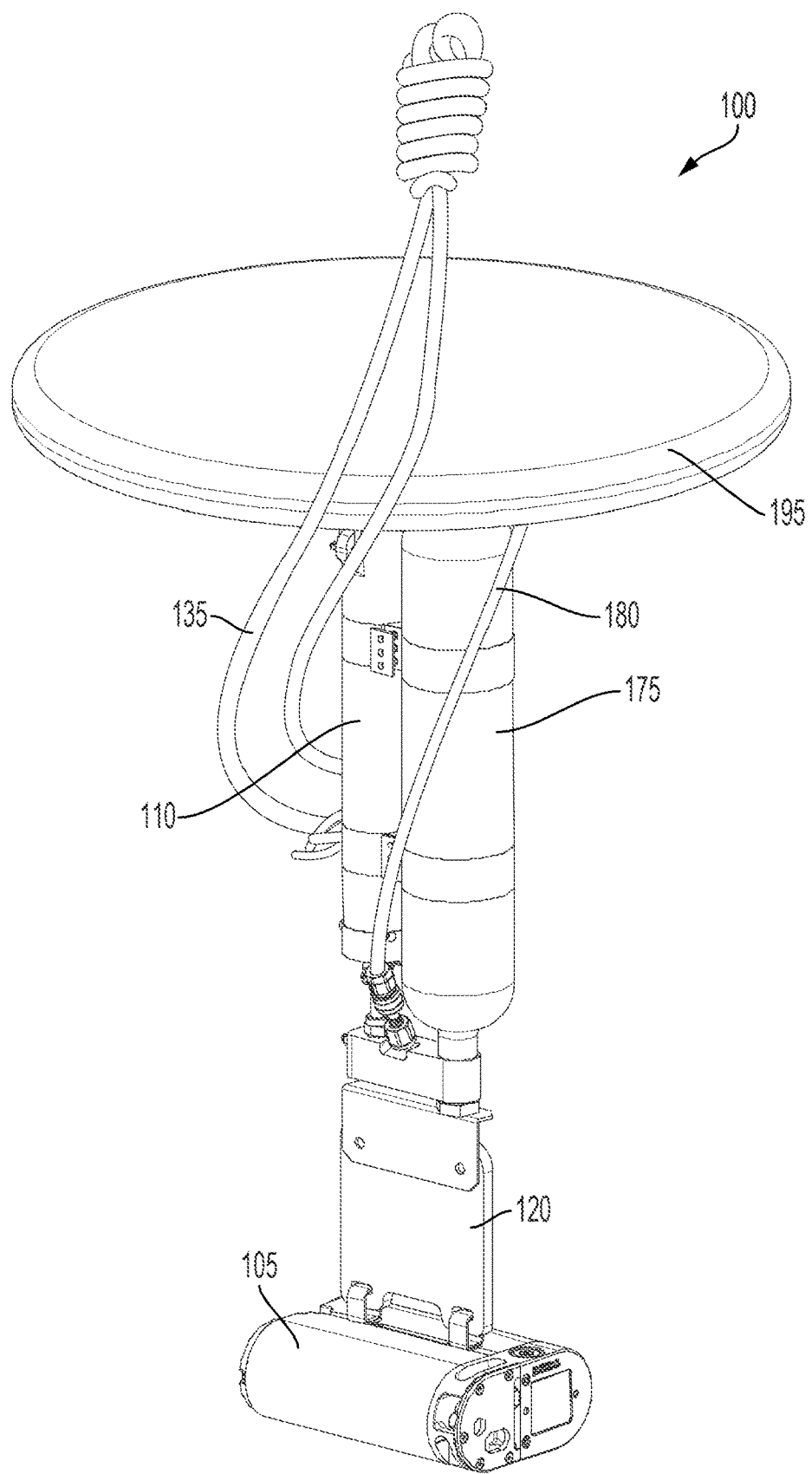
FIG. 3B illustrates a seismic data acquisition positioning apparatus, according to an example implementation.

FIG. 3B illustrates a seismic data acquisition positioning apparatus 100. The seismic data acquisition positioning apparatus 100 can include the seismic data acquisition unit 105. The seismic data acquisition unit 105 can include the case having the wall defining the internal compartment. The seismic data acquisition unit 105 can include a power source, a clock, a seismic data recorder, a control unit, and at least one sensor disposed within the case. The seismic data acquisition positioning apparatus 100 can include the hanging unit 110. The hanging unit 110 can include the beacon unit 115. The seismic data acquisition positioning apparatus 100 can include the connector 120 having a first end coupled with the seismic data acquisition unit 105 and having a second end coupled with the hanging unit 110. The seismic data acquisition positioning apparatus 100 can include the retrieval unit 135. The retrieval unit 135 can include the balloon 195. The retrieval unit 135 can include a rope. The seismic data acquisition positioning apparatus 100 can include the gas canister 175. The seismic data acquisition positioning apparatus 100 can include the hose 180. The hose 180 can couple the balloon 195 with the hanging unit 110.

Figure 3C:
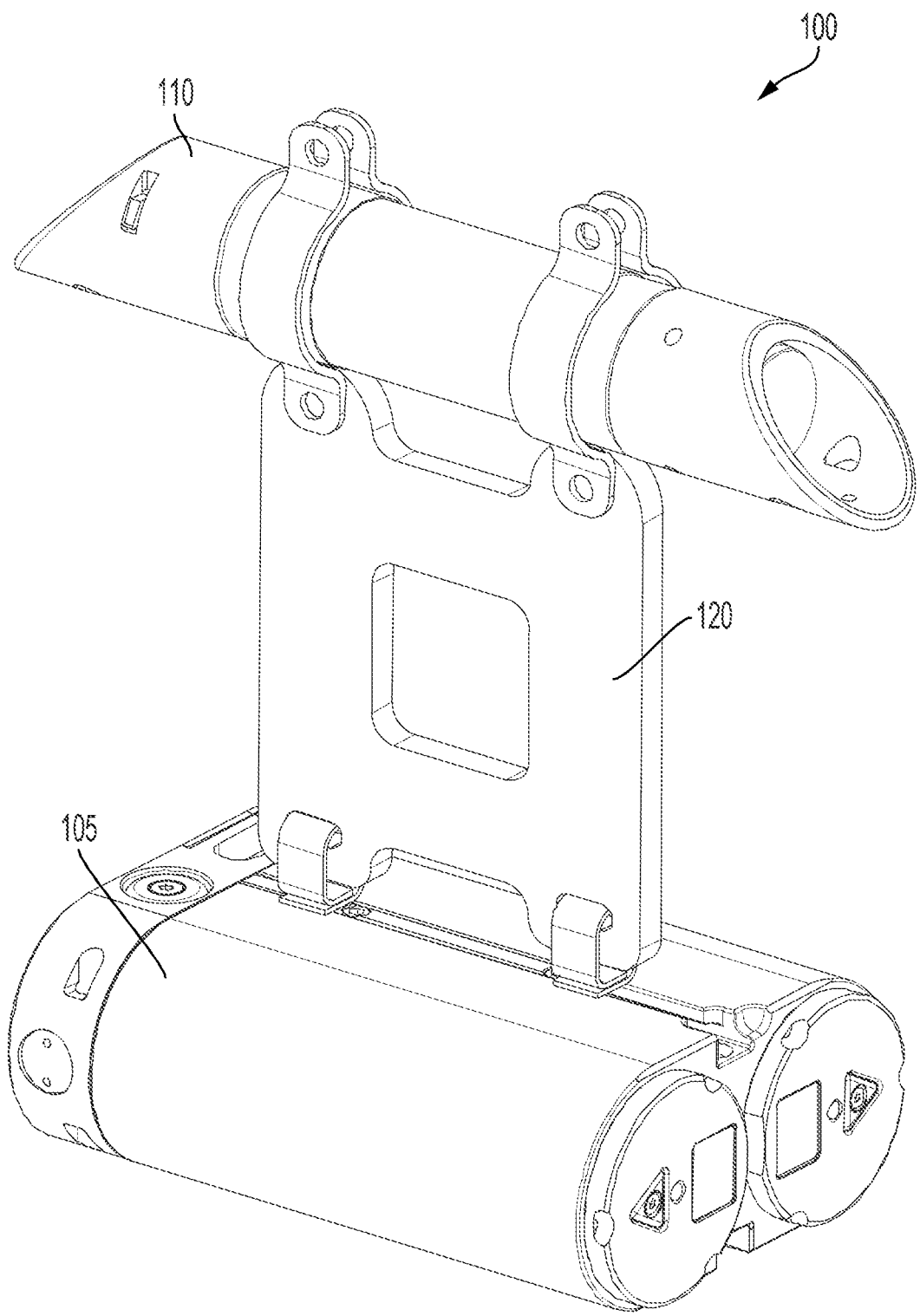
FIG. 3C illustrates a seismic data acquisition positioning apparatus, according to an example implementation.

FIG. 3C illustrates a seismic data acquisition positioning apparatus 100. The seismic data acquisition positioning apparatus 100 can include the seismic data acquisition unit 105. The seismic data acquisition unit 105 can include the case having the wall defining the internal compartment. The seismic data acquisition unit 105 can include a power source, a clock, a seismic data recorder, a control unit, and at least one sensor disposed within the case. The seismic data acquisition positioning apparatus 100 can include the hanging unit 110. The hanging unit 110 can include the beacon unit 115. The seismic data acquisition positioning apparatus 100 can include the connector 120 having a first end coupled with the seismic data acquisition unit 105 and having a second end coupled with the hanging unit 110. The retrieval unit 135 may be absent from the seismic data acquisition positioning apparatus 100. The hanging unit 110 can have a shape profile configured to increase drag. The seismic data acquisition positioning apparatus 100 can include a battery-powered fan. The battery-powered fan can position the seismic data acquisition unit 105 at a specific location. The hanging unit 110 can have a shape profile configured to create a disparity in fall rates between the hanging unit 110 and the seismic data acquisition unit 105. The hanging unit 110 can be above the seismic data acquisition unit 105 as the seismic data acquisition positioning apparatus 100 falls through water. The seismic data acquisition unit 105 can be retrieved by a remotely operated vehicle.

Figure 4A:
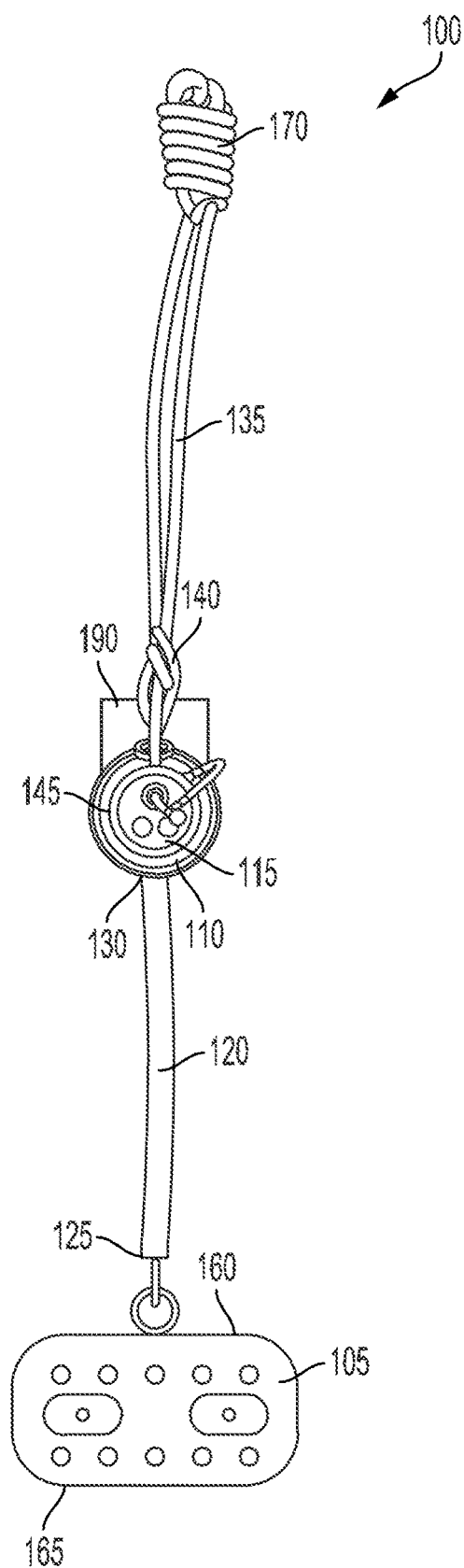
FIG. 4A illustrates a seismic data acquisition positioning apparatus, according to an example implementation.

FIG. 4A illustrates a seismic data acquisition positioning apparatus 100. The seismic data acquisition positioning apparatus 100 can include the seismic data acquisition unit 105. The seismic data acquisition unit 105 can include the case having the wall defining the internal compartment. The seismic data acquisition unit 105 can include a power source, a clock, a seismic data recorder, a control unit, and at least one sensor disposed within the case. The seismic data acquisition positioning apparatus 100 can include the hanging unit 110. The hanging unit 110 can include the beacon unit 115. The hanging unit 110 can include the buoyant unit 190. The buoyant unit 190 can allow the hanging unit 110 to achieve a target buoyancy. The seismic data acquisition positioning apparatus 100 can include the connector 120 having a first end coupled with the seismic data acquisition unit 105 and having a second end coupled with the hanging unit 110. The seismic data acquisition positioning apparatus 100 can include the retrieval unit 135 having a first end coupled with a first portion of the hanging unit 145 and having a second end coupled with a second portion of the hanging unit 155.

Figure 4B:
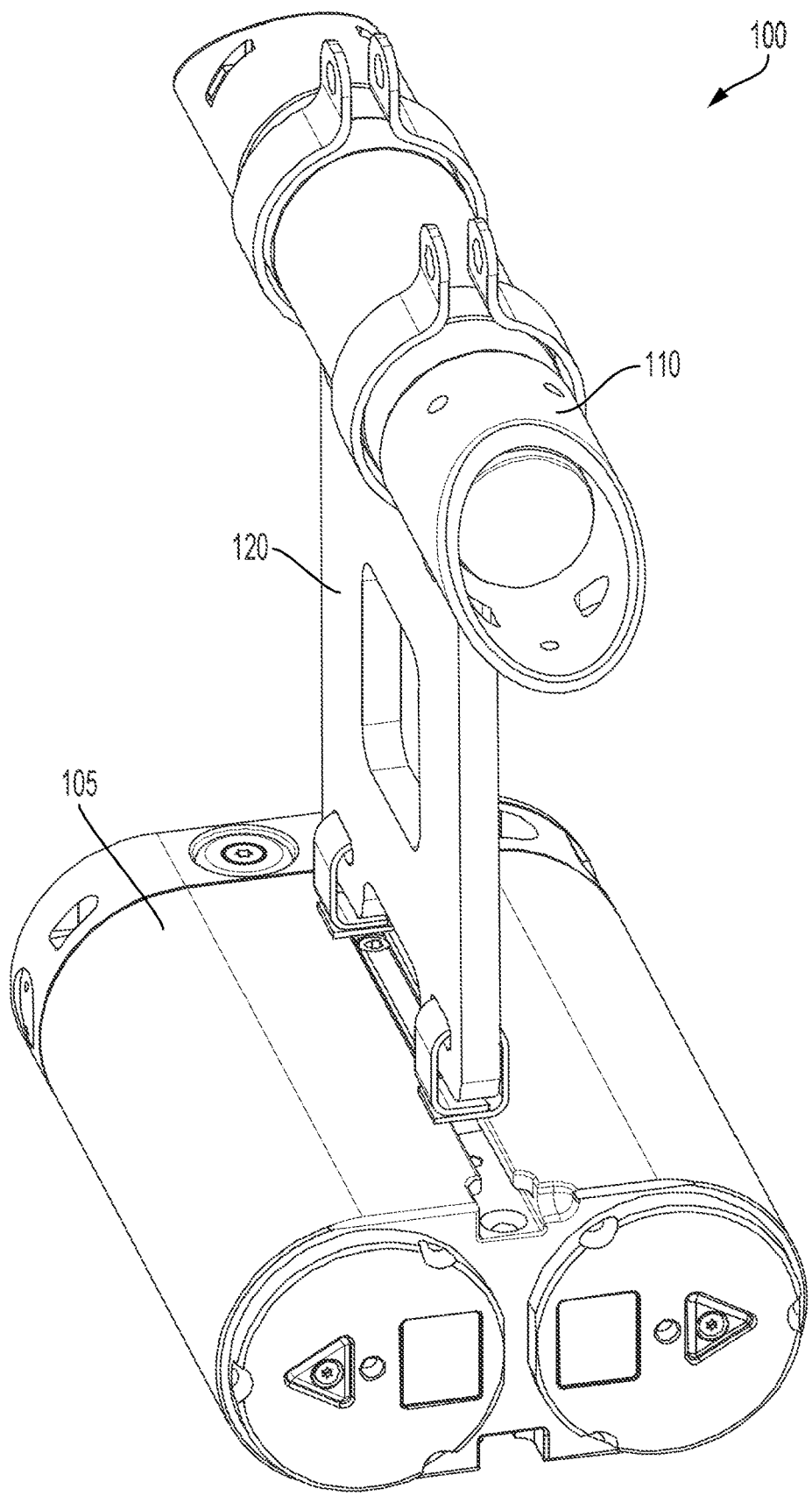
FIG. 4B illustrates a seismic data acquisition positioning apparatus, according to an example implementation.

FIG. 4B illustrates a seismic data acquisition positioning apparatus 100. The seismic data acquisition positioning apparatus 100 can include the seismic data acquisition unit 105. The seismic data acquisition unit 105 can include the case having the wall defining the internal compartment. The seismic data acquisition unit 105 can include a power source, a clock, a seismic data recorder, a control unit, and at least one sensor disposed within the case. The seismic data acquisition positioning apparatus 100 can include the hanging unit 110. The hanging unit 110 can include the beacon unit 115. The seismic data acquisition positioning apparatus 100 can include the connector 120 having a first end coupled with the seismic data acquisition unit 105 and having a second end coupled with the hanging unit 110. The retrieval unit 135 may be absent from the seismic data acquisition positioning apparatus 100. The hanging unit 110 can have a shape profile configured to increase drag. The seismic data acquisition positioning apparatus 100 can include a battery-powered fan. The battery-powered fan can position the seismic data acquisition unit 105 at a specific location. The hanging unit 110 can have a shape profile configured to create a disparity in fall rates between the hanging unit 110 and the seismic data acquisition unit 105. The hanging unit 110 can be above the seismic data acquisition unit 105 as the seismic data acquisition positioning apparatus 100 falls through water. The seismic data acquisition unit 105 can be retrieved by a remotely operated vehicle.

Figure 5:
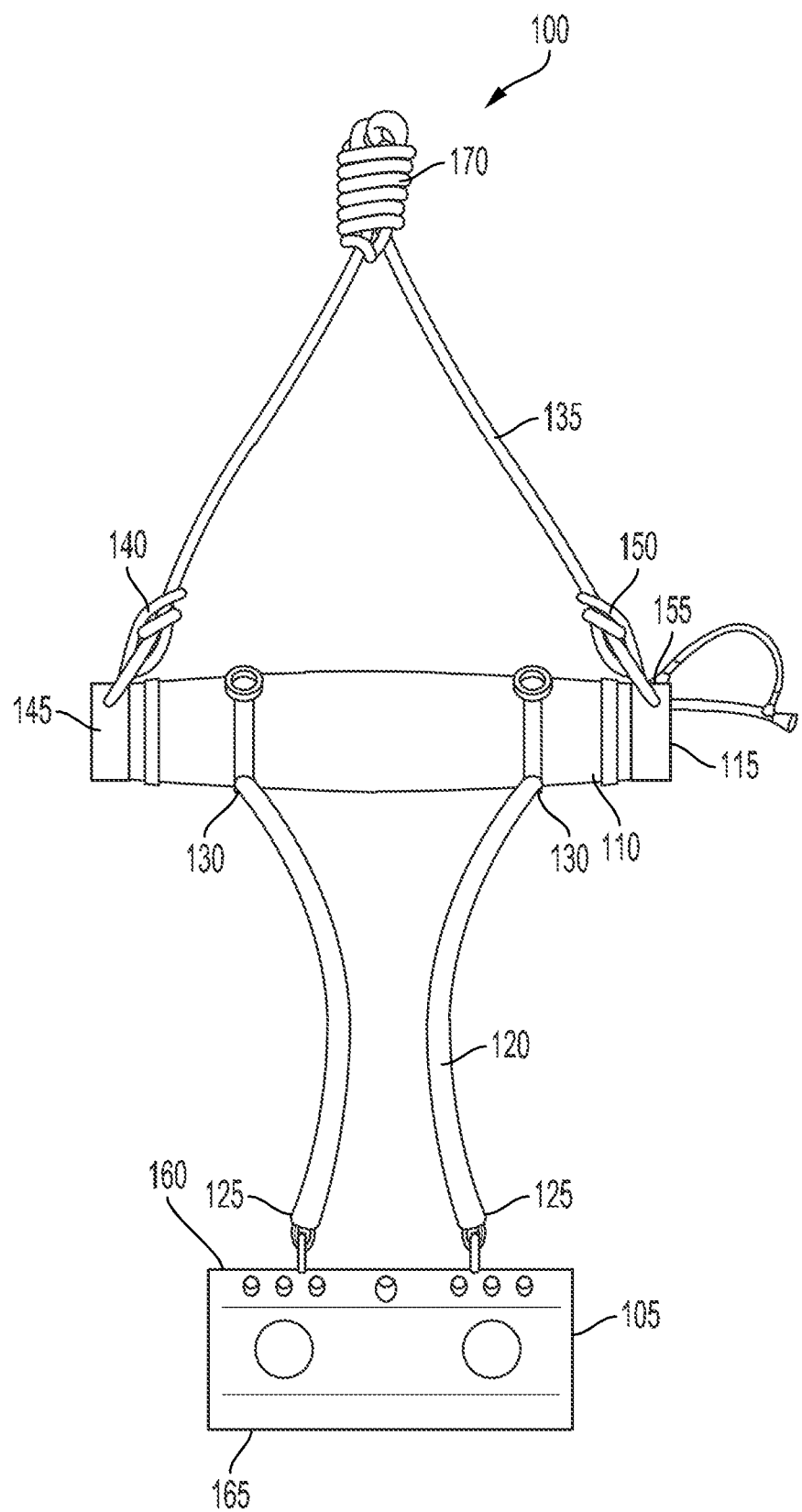
FIG. 5 illustrates a seismic data acquisition positioning apparatus, according to an example implementation.

FIG. 5 illustrates a seismic data acquisition positioning apparatus 100. The seismic data acquisition positioning apparatus 100 can include the seismic data acquisition unit 105. The seismic data acquisition unit 105 can include the case having the wall defining the internal compartment. The seismic data acquisition unit 105 can include a power source, a clock, a seismic data recorder, a control unit, and at least one sensor disposed within the case. The seismic data acquisition positioning apparatus 100 can include the hanging unit 110. The hanging unit 110 can include the beacon unit 115. The hanging unit 110 can have a target buoyancy without the buoyant unit 190. The seismic data acquisition positioning apparatus 100 can include the connector 120 having a first end coupled with the seismic data acquisition unit 105 and having a second end coupled with the hanging unit 110. The seismic data acquisition positioning apparatus 100 can include the retrieval unit 135 having a first end coupled with a first portion of the hanging unit 145 and having a second end coupled with a second portion of the hanging unit 155.

FIG. 6A illustrates a seismic data acquisition positioning apparatus 100. The seismic data acquisition positioning apparatus 100 can be positioned on the seafloor 610 (e.g., ocean bottom). The second side 165 of the seismic data acquisition unit 105 can be coupled with (e.g., interface with, laying on, positioned on, etc.) the seafloor 610. The hanging unit 110 can be positioned on the seafloor 610. The hanging unit 110 can disposed a first distance 615 from the seismic data acquisition unit 105. For example, the hanging unit 110 can disposed a first distance 615 from the seismic data acquisition unit 105 when the hanging unit 110 and the seismic data acquisition unit 105 are disposed on the seafloor 610. The first distance 615 can be a fixed distance. The hanging unit 110 can be disposed on a left side, right side, front side, back side, or any other side of the seismic data acquisition unit 105.

Figure 6B:
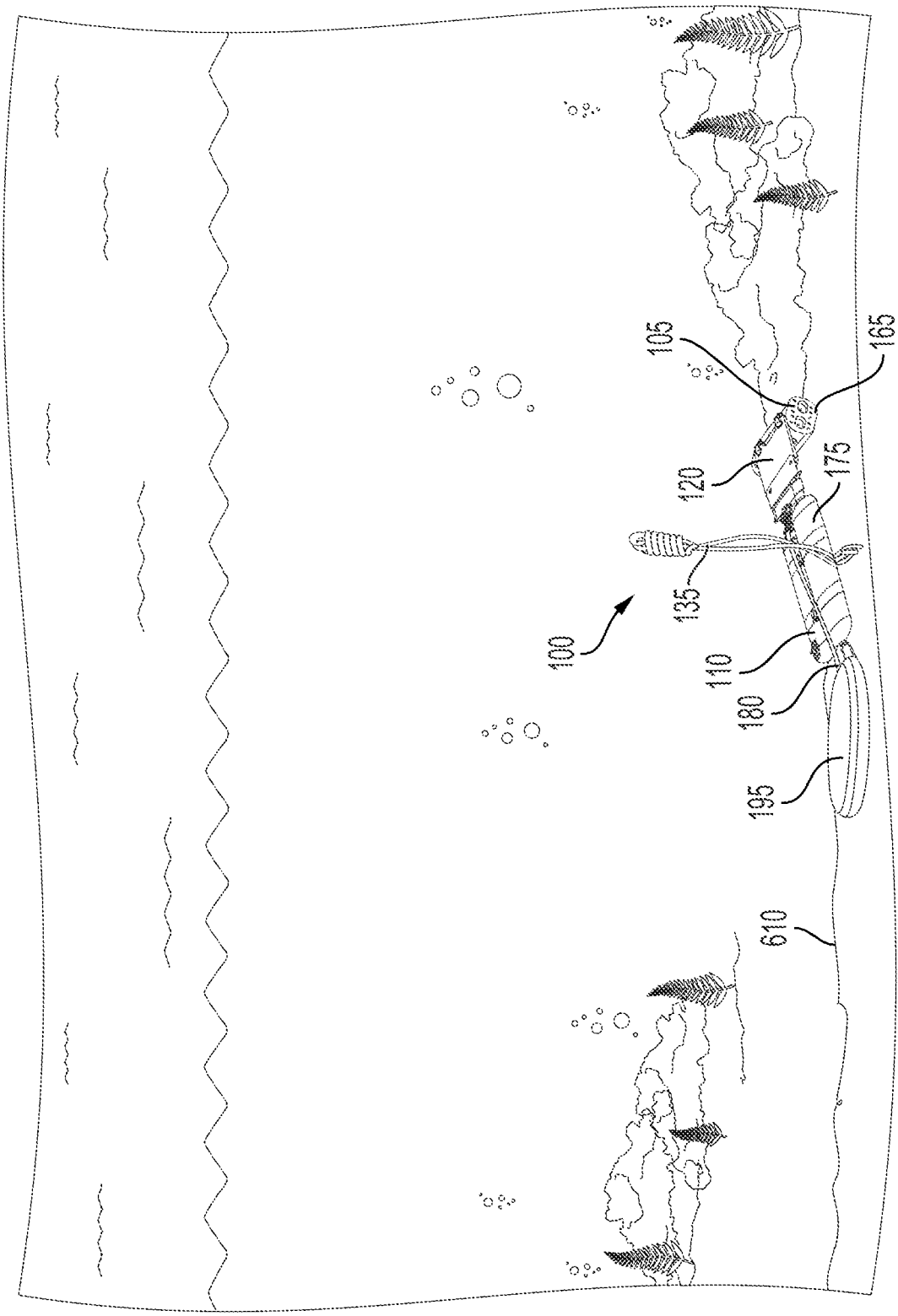
FIG. 6B illustrates a seismic data acquisition positioning apparatus, according to an example implementation.

The retrieval unit 135 can float above the hanging unit 110. For example, the buoyant knot 170 can float above the hanging unit 110. The buoyant knot 170 can be disposed a second distance 620 from the hanging unit 110. The first distance 615 can be greater than the second distance 620. For example, the first distance 615 can be such that the buoyant knot 170 cannot reach the seismic data acquisition unit 105. The first distance 615 can be less than the second distance 620. For example, the first distance 615 can be such that the buoyant knot 170 does not hit the seismic data acquisition unit 105 while the retrieval unit 135 is in an ocean environment. The first distance 615 can be such that the buoyant knot 170 does not transmit vibrations to the seismic data acquisition unit 105 while the retrieval unit 135 is in an ocean environment FIG. 6B illustrates a seismic data acquisition positioning apparatus 100. The seismic data acquisition positioning apparatus 100 can be positioned on the seafloor 610 (e.g., ocean bottom). The second side 165 of the seismic data acquisition unit 105 can be coupled with (e.g., interface with, laying on, positioned on, etc.) the seafloor 610. The hanging unit 110 can be positioned on the seafloor 610. The hanging unit 110 can be disposed on a left side, right side, front side, back side, or any other side of the seismic data acquisition unit 105. The connector 120 can pivot about the first end of the connector 120. The retrieval unit 135 can float above the hanging unit 110. The balloon 195 can be positioned on the seafloor 610.

Figure 7:
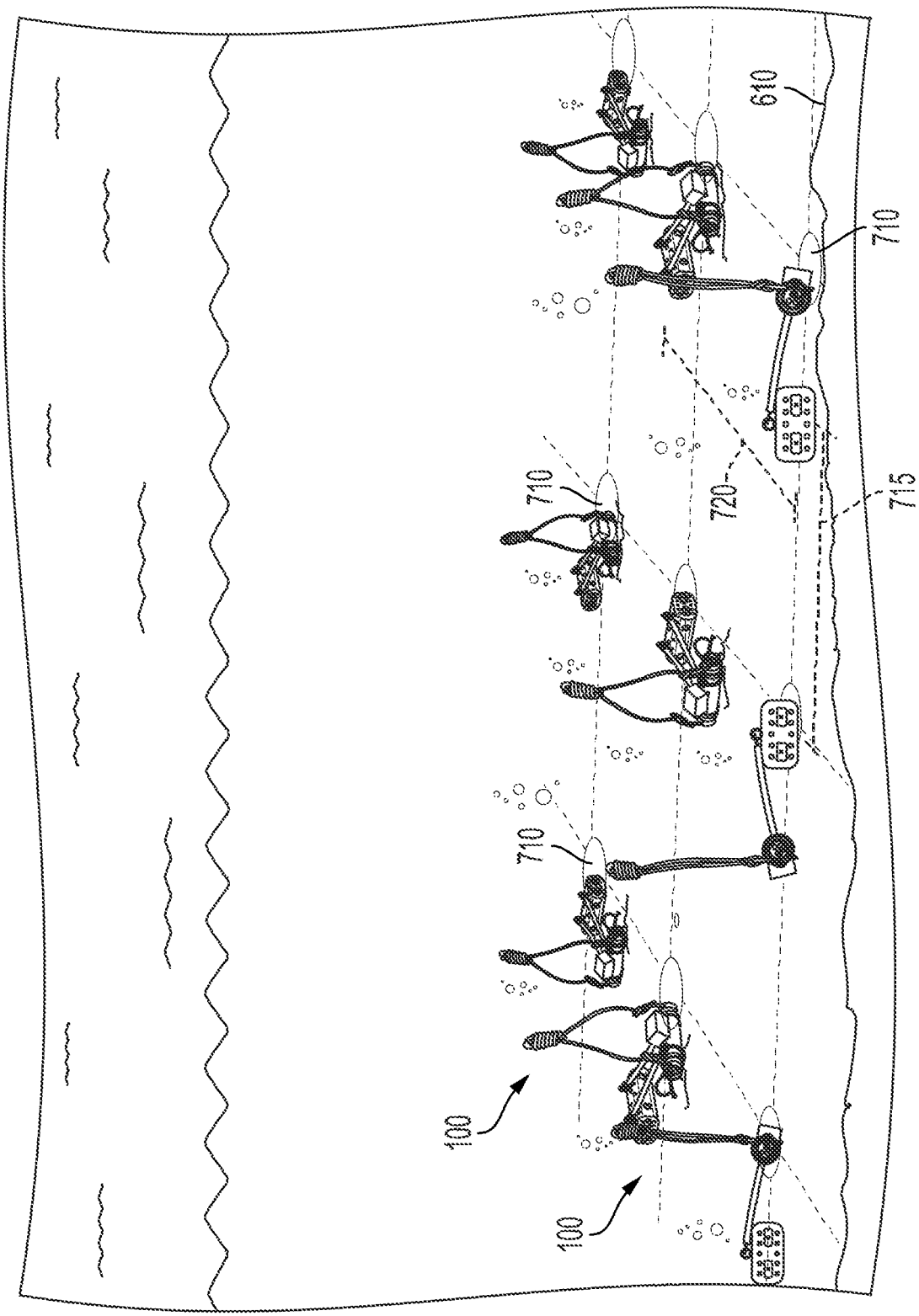
FIG. 7 illustrates seismic data acquisition positioning apparatuses, according to an example implementation.

FIG. 7 illustrates seismic data acquisition positioning apparatuses 100. The seismic data acquisition positioning apparatuses 100 can be a part of a positioning system. The seismic data acquisition positioning apparatuses 100 can include a plurality of seismic data acquisition positioning apparatuses 100. The seismic data acquisition positioning apparatus 100 can be located (e.g., disposed, placed, etc.) in a target area 710. For example, the seismic data acquisition positioning apparatus 100 can be dropped onto the seafloor 610 such that the seismic data acquisition positioning apparatus 100 lands in the target area 710. The seismic data acquisition positioning apparatus 100 can be dropped such that the seismic data acquisition unit 105 does not fall on its edge. The seismic data acquisition positioning apparatus 100 can be dropped such that a base of the seismic data acquisition unit 105 makes contact with the seafloor. The seismic data acquisition positioning apparatus 100 can land with a target orientation (e.g., top part up, bottom part down). The target area 710 can have a circular shape or any other shape that defines a landing perimeter of the seismic data acquisition positioning apparatus 100. A plurality of target areas 710 can be organized in a grid or other pattern on the seafloor 610. Each of the plurality of target areas 710 can be equally spaced or non-equally spaced in a chosen pattern or randomly spaced from one another. The target area 710 can have a diameter in a range of 2 meters to 200 meters. For example, the target area 710 can have a diameter of 2 meters, 20 meters, 40 meters, 60 meters, 80 meters, 100 meters, 150 meters, or 200 meters. The seismic data acquisition positioning apparatuses 100 can land partly on the target areas 710. The seismic data acquisition positioning apparatus 100 can land in a location ±20 meters from an intended target. The seismic data acquisition positioning apparatus 100 can land with an accuracy of ±20 meters plus 10% of the water depth.

A first seismic data acquisition positioning apparatus 100 can be disposed a third distance 715 from a second seismic data acquisition positioning apparatus 100. The third distance 715 can be between 50 and 1000 meters. For example, the third distance 715 can be 50 meters, 100 meters, 250 meters, 500 meters, or 100 meters. The second seismic data acquisition positioning apparatus 100 can be disposed a fourth distance 720 from a third seismic data acquisition positioning apparatus 100. The fourth distance 720 can be between 50 and 1000 meters. For example, the fourth distance 720 can be 50 meters, 100 meters, 250 meters, 500 meters, or 100 meters. The third distance 715 can be equal to the fourth distance 720. The third distance 715 can be different from the fourth distance 720. The seismic data acquisition unit 105 of the first seismic data acquisition positioning apparatus 100 can be disposed the third distance 715 from the seismic data acquisition unit 105 of the second seismic data acquisition positioning apparatus 100. The seismic data acquisition unit 105 of the second seismic data acquisition positioning apparatus 100 can be disposed the fourth distance 720 from the seismic data acquisition unit 105 of the third seismic data acquisition positioning apparatus 100.

The hanging unit 110 can be disposed the first distance 615 from the seismic data acquisition unit 105. The hanging unit 110 can be disposed on a left side, right side, front side, back side, or any other side of the seismic data acquisition unit 105. For example, the hanging unit 110 of the first seismic data acquisition positioning apparatus 100 can be disposed on the left side of the seismic data acquisition unit 105. The hanging unit 110 of the second seismic data acquisition positioning apparatus 100 can be disposed on the right side of the seismic data acquisition unit 105. The hanging unit 110 of the third seismic data acquisition positioning apparatus 100 can be disposed on the back and left side of the seismic data acquisition unit 105. The beacon unit 115 of the seismic data acquisition positioning apparatus 100 can transmit a signal to indicate the position of the seismic data acquisition positioning apparatus 100 on the seafloor 610. The beacon unit 115 of the seismic data acquisition positioning apparatus 100 can initiate an acoustic transmission.

Figure 8:
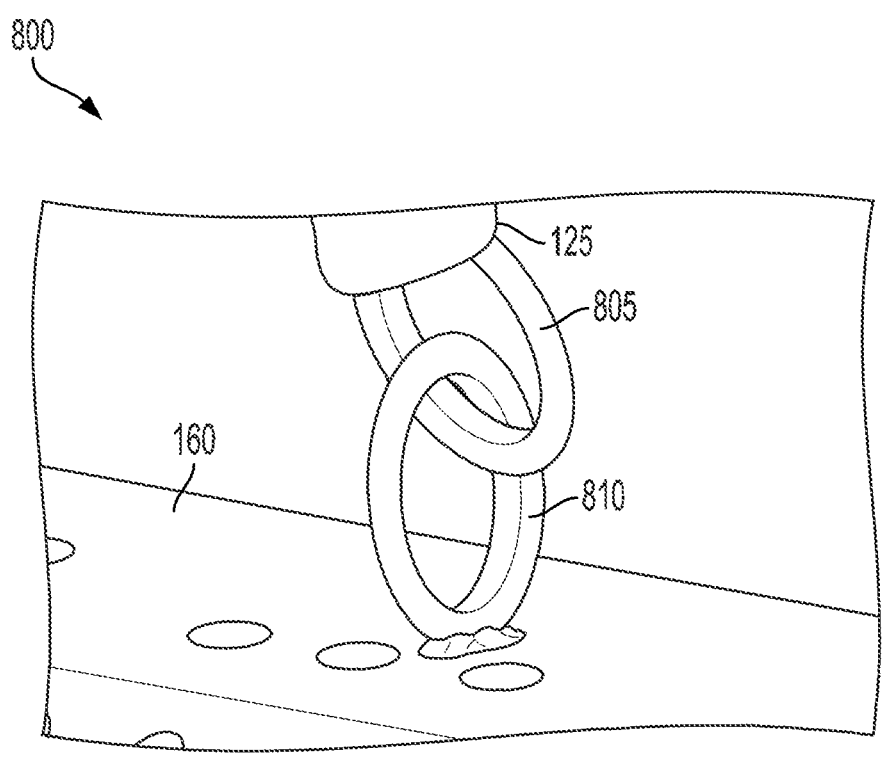
FIG. 8 illustrates a seismic data acquisition positioning apparatus connector, according to an example implementation.

FIG. 8 illustrates a seismic data acquisition positioning apparatus connector 800. The seismic data acquisition positioning apparatus connector 800 can include the first end (e.g., first end 125 of the connector 120). The first end 125 of the connector 120 can be coupled with the seismic data acquisition unit 105. The first end 125 of the connector 120 can be directly coupled with the seismic data acquisition unit 105. For example, the first end 125 of the connector 120 can be mounted on the seismic data acquisition unit 105. The first end 125 of the connector 120 can be mounted on a case of the seismic data acquisition unit 105. The first end 125 of the connector 120 can be mounted with the first side 160 of the seismic data acquisition unit 105. The first end 125 of the connector 120 can be indirectly coupled with the seismic data acquisition unit 105. For example, the first end 125 of the connector 120 can be coupled with the seismic data acquisition unit 105 via a cable, rope, or hose clamp. The first end 125 of the connector 120 can be coupled with the seismic data acquisition unit 105 via a rope 805 (e.g., nylon rope, Kevlar rope, HMPE, carbon fiber rope, polyester rope, polypropylene rope, stress member, etc.) attached to a ring 810 disposed on the seismic data acquisition unit 105. The ring 810 can be welded to the seismic data acquisition unit 105.

Figure 9:
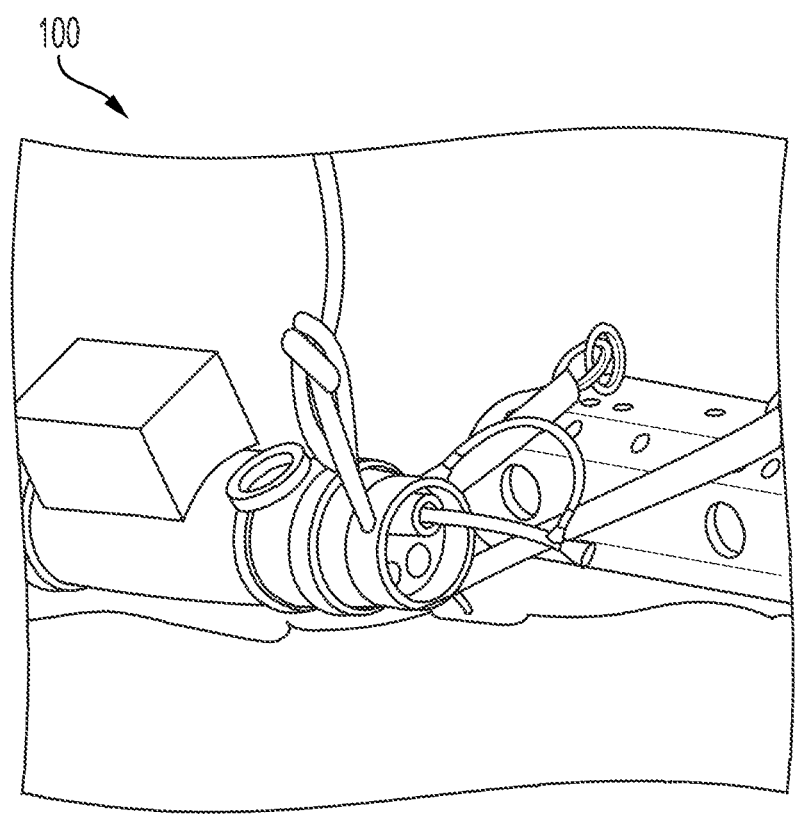
FIG. 9 illustrates a seismic data acquisition positioning apparatus, according to an example implementation.

FIG. 9 illustrates a seismic data acquisition positioning apparatus 100. The seismic data acquisition positioning apparatus 100 can be positioned on the seafloor 610. The second side 165 of the seismic data acquisition unit 105 can be coupled with (e.g., interface with, laying on, positioned on, etc.) the seafloor 610. The hanging unit 110 can be positioned on the seafloor 610. The hanging unit 110 can disposed a first distance 615 from the seismic data acquisition unit 105. For example, the hanging unit 110 can disposed a first distance 615 from the seismic data acquisition unit 105 when the hanging unit 110 and the seismic data acquisition unit 105 are disposed on the seafloor 610. The first distance 615 can be a fixed distance. The hanging unit 110 can be disposed on a left side, right side, front side, back side, or any other side of the seismic data acquisition unit 105. The hanging unit 110 can be oriented such that the antennae is located above the seafloor 610. For example, the seismic data acquisition unit 105 can be buried beneath the seafloor (e.g., underneath mud, rocks, etc.). The hanging unit 110 can be located in the seafloor or above the seafloor. The antennae can be located outside of the seafloor and/or mud. The hanging unit 110 can be positioned on the seafloor 610 on a preferential side of the seismic data acquisition unit 105. For example, the preferential side of the seismic data acquisition unit 105 can include a side such that the antennae is located above the seafloor 610. The hanging unit 110 can have a shape profile configured to encourage one side of the hanging unit 110 to fall to the seafloor 610 such that the antennae points or is oriented towards the water surface. The hanging unit 110 can have a buoyancy profile configured to encourage one side of the hanging unit 110 to fall to the seafloor 610 such that the antennae points or is oriented towards the water surface. The hanging unit 110 can have a weight profile configured to encourage one side of the hanging unit 110 to fall to the seafloor 610 such that the antennae points or is oriented towards the water surface. For example, the hanging unit 110 can be asymmetrically weighted such that the hanging unit 110 lands on a preferential side of the seismic data acquisition unit 105.

Figure 10A:
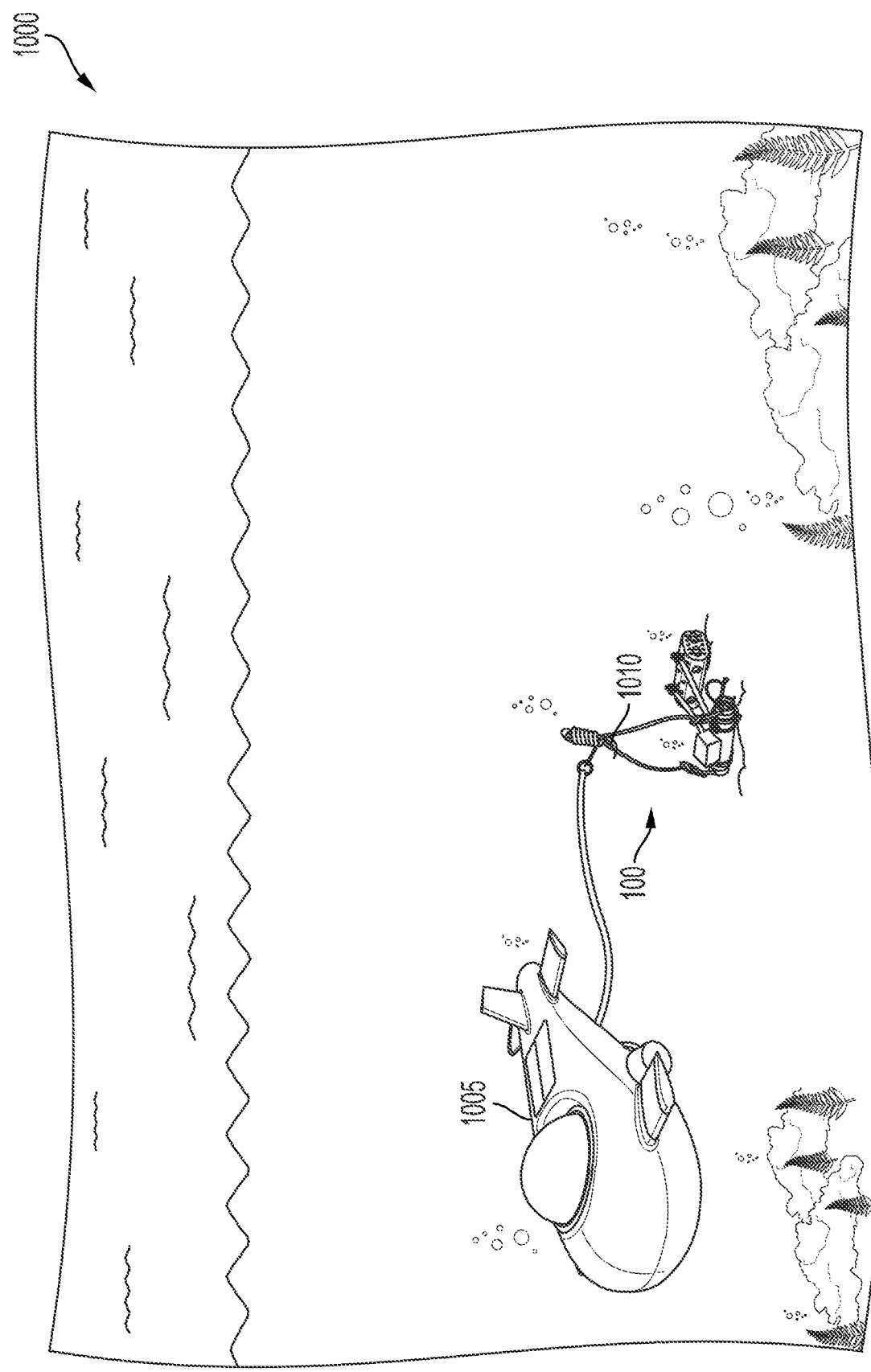
FIG. 10A illustrates a seismic data acquisition system, according to an example implementation.

FIG. 10A illustrates a seismic data acquisition system 1000. The seismic data acquisition system 1000 can include the seismic data acquisition positioning apparatus 100. The seismic data acquisition system 1000 can include a remotely operated vehicle 1005 (e.g., underwater vehicle, ROV, etc.). The remotely operated vehicle 1005 can grab a hoop formed by the retrieval unit 135 using a hook 1010. The remotely operated vehicle 1005 can coupled with the retrieval unit 135. For example, the remotely operated vehicle 1005 can grab the retrieval unit. The remotely operated vehicle 1005 can pick up the seismic data acquisition unit 105 directly. The remotely operated vehicle 1005 can include an arm (e.g., fixed arm or robotic arm) which can move towards the hoop formed by the retrieval unit 135. The arm can move within the perimeter of the hoop. The remotely operated vehicle 1005 can engage with a protrusion of the retrieval unit 135. The remotely operated vehicle 1005 can engage with the retrieval unit 135. The remotely operated vehicle 1005 can spear the retrieval unit 135. The remotely operated vehicle 1005 can lift the seismic data acquisition positioning apparatus 100. The remotely operated vehicle 1005 can move the seismic data acquisition positioning apparatus 100 via the hoop. For example, remotely operated vehicle 1005 can use the arm to lift rope up via the hoop, which can lift up the seismic data acquisition unit 105. The remotely operated vehicle 1005 can detect the seismic data acquisition unit 105 via a beacon from the beacon unit 115. The remotely operated vehicle 1005, using the hoop to pick up the seismic data acquisition unit 105, can more efficiently retrieve the seismic data acquisition units 105 to more efficiently perform the seismic survey. For example, using the hoop configuration can save up to 30 seconds, 1 minute, 2 minutes or more per seismic data acquisition unit 105 for retrieval, which can reduce the overall resource consumption of the underwater vehicle or ROV, battery usage, power usage, or number of seismic data acquisition units 105 used. The remotely operated vehicle 1005 can perform a fly-by retrieval. A fly-by retrieval can include retrieving seismic data acquisition units 105 while the remotely operated vehicle 1005 is in motion. The fly-by retrieval can save time over the remotely operated vehicle 1005 having to stop to retrieve nodes. The remotely operated vehicle 1005 can transmit status information for the seismic data acquisition unit 105. The remotely operated vehicle 1005 can detect the seismic data acquisition unit 105 via a beacon from the beacon unit 115. The remotely operated vehicle 1005 can detect the seismic data acquisition unit 105 via an optical beacon from the beacon unit 115. The seismic data acquisition unit 105 can be configured to respond to polling.

Figure 10B:
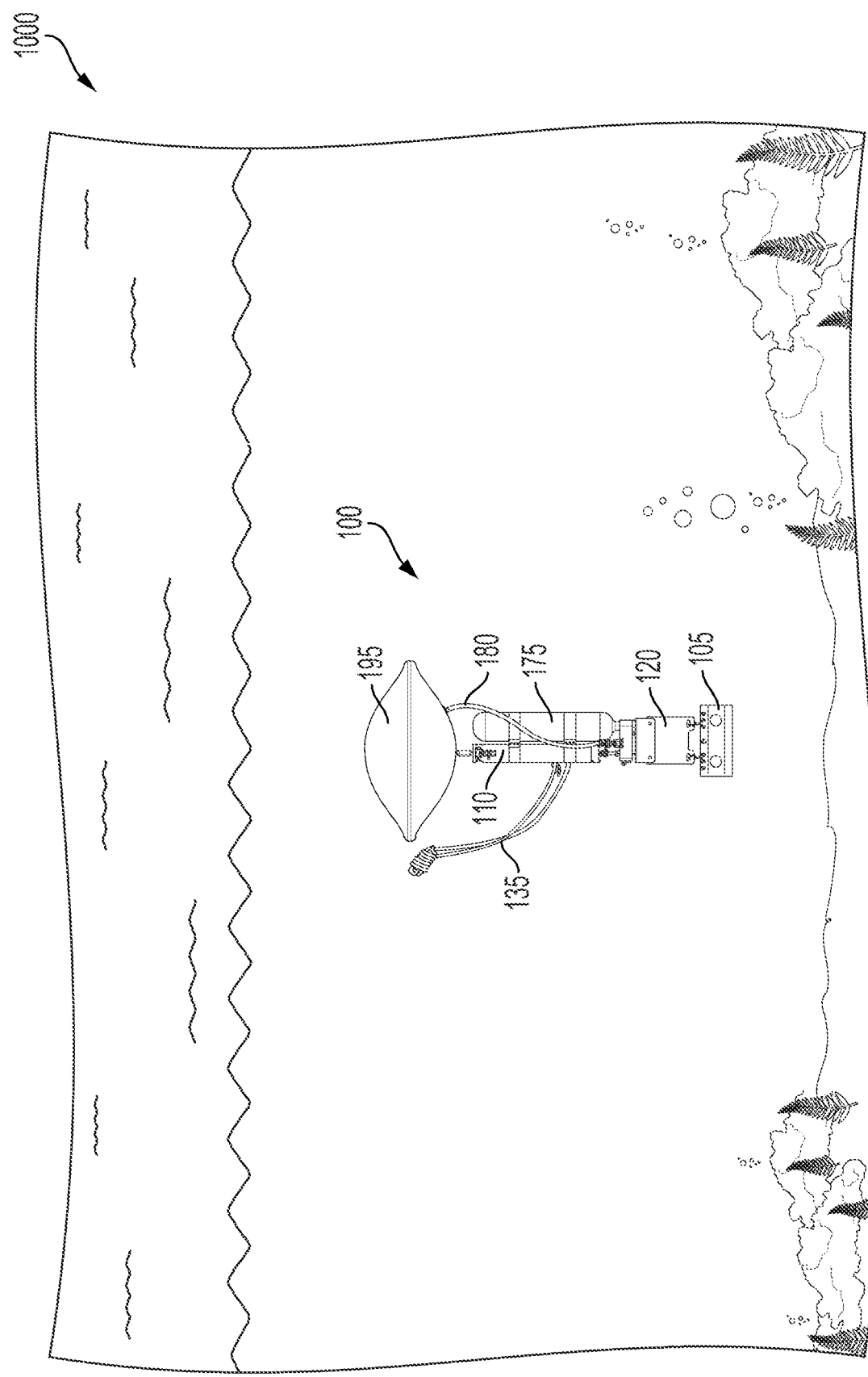
FIG. 10B illustrates a seismic data acquisition positioning apparatus, according to an example implementation.

FIG. 10B illustrates a seismic data acquisition positioning apparatus 100. The seismic data acquisition positioning apparatus 100 can include the seismic data acquisition unit 105. The seismic data acquisition unit 105 can include the case having the wall defining the internal compartment. The seismic data acquisition unit 105 can include a power source, a clock, a seismic data recorder, a control unit, and at least one sensor disposed within the case. The seismic data acquisition positioning apparatus 100 can include the hanging unit 110. The hanging unit 110 can include the beacon unit 115. The seismic data acquisition positioning apparatus 100 can include the connector 120 having a first end coupled with the seismic data acquisition unit 105 having a second end coupled with the hanging unit 110. The seismic data acquisition positioning apparatus 100 can include the retrieval unit 135. The retrieval unit 135 can include the balloon 195. The retrieval unit 135 can include a rope. The seismic data acquisition positioning apparatus 100 can include the gas canister 175. The seismic data acquisition positioning apparatus 100 can include the hose 180. The hose 180 can couple the balloon 195 with the hanging unit 110. The balloon 195 can be inflated by the gas canister 175. The balloon 195 can lift the seismic data acquisition unit 105 off the seafloor and to the water surface.

Figure 11:
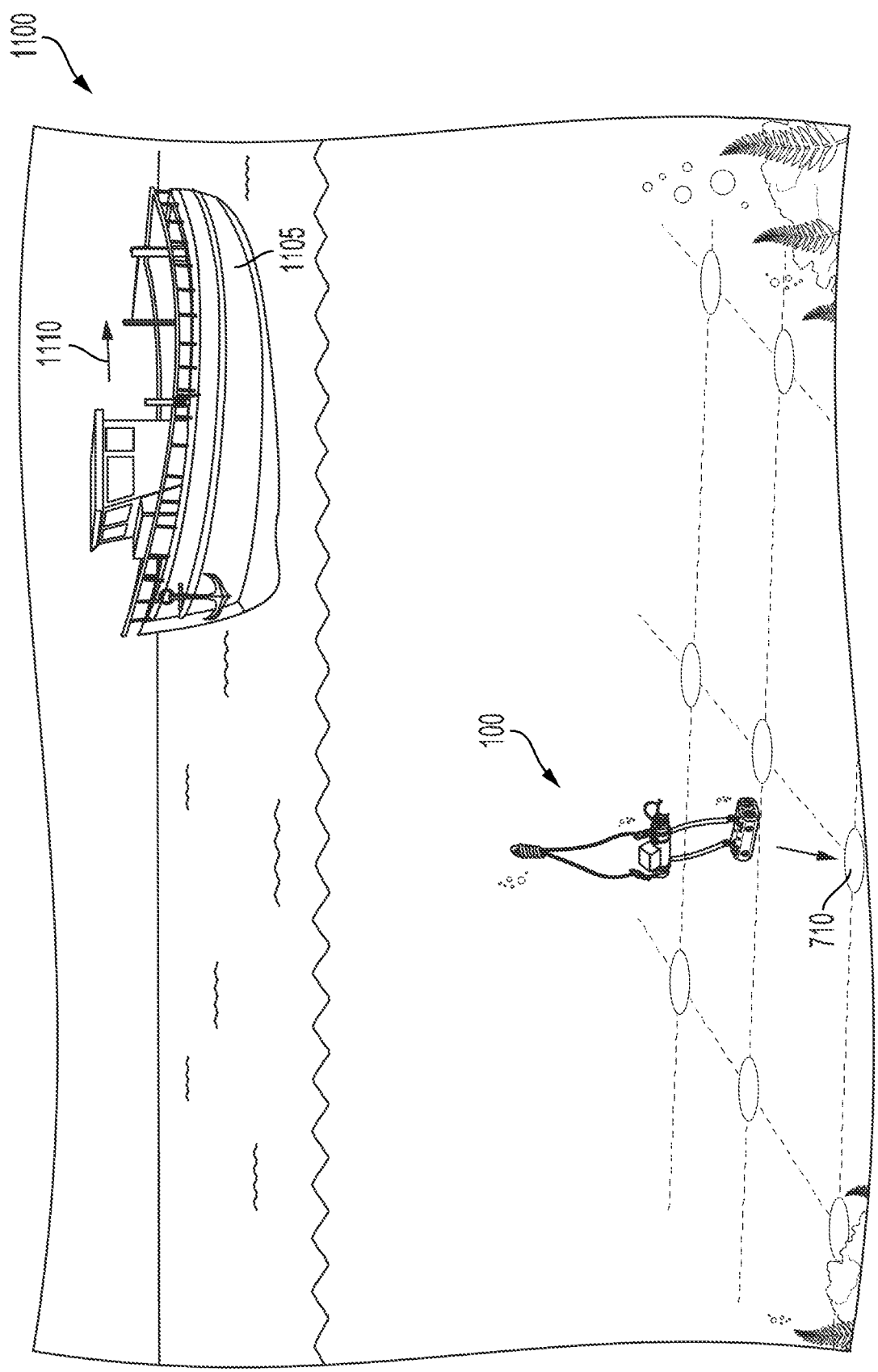
FIG. 11 illustrates a seismic data acquisition system, according to an example implementation.

FIG. 11 illustrates a seismic data acquisition positioning system 1100. The seismic data acquisition positioning system 1100 can include a vessel 1105 (e.g., surface vessel). The vessel 1105 can be positioned on a surface of a water column and include a deck which supports operation equipment. The vessel 1105 can include electronics, such as shipside electronics, that can retrieve seismic data from or with the seismic data acquisition unit 105, perform quality assessments, status checks, or charge one or more batteries of the seismic data acquisition unit 105. The vessel 1105 can move in a direction as indicated by arrow 1110. The seismic data acquisition positioning apparatus 100 can be deployed off the vessel 1105. The seismic data acquisition positioning apparatus 100 can descend towards the target area 710 on the seafloor 610. The seismic data acquisition positioning apparatus 100 can reach the target area 710 as the vessel 1105 is moving in the direction as indicated by arrow 1110. The descent of the seismic data acquisition positioning apparatus 100 can be affected by underwater currents. The seismic data acquisition positioning apparatus 100 can be deployed to take the underwater currents into account. The overall shape of the seismic data acquisition positioning apparatus 100 can have a hydrodynamic profile that allows the seismic data acquisition positioning apparatus 100 to descend towards a target area in a controlled manner. The seismic data acquisition positioning apparatus 100 can include one or more descent elements (e.g., fins, rudders, streamers pathways, channels, etc.) to control the descent of the seismic data acquisition positioning apparatus 100. For example, the hanging unit 110 or the seismic data acquisition unit case can include one or more fins. The one or more fins can make the seismic data acquisition positioning apparatus 100 spin in a controlled manner. The seismic data acquisition positioning apparatus 100 can include one or more fixed fins to make the seismic data acquisition positioning apparatus 100 spin in a certain pattern. The seismic data acquisition positioning apparatus 100 can be deployed from the vessel 1105 and land in an intended target area 710. The vessel 1105 can detect the seismic data acquisition unit 105 via a beacon from the beacon unit 115.

The seismic data acquisition positioning apparatus 100 can be deployed by dropping the seismic data acquisition unit 105. The seismic data acquisition positioning apparatus 100 can be deployed by dropping the seismic data acquisition unit 105 from a vessel. The seismic data acquisition positioning apparatus 100 can be deployed by dropping the seismic data acquisition unit 105 from a helicopter. The seismic data acquisition positioning apparatus 100 can be deployed by dropping the seismic data acquisition unit 105 from a drone (e.g., air done, marine drone, etc.). The marine drone can drop the seismic data acquisition unit 105 from the surface of the water. The marine drone can drop the seismic data acquisition unit 105 from underwater with an ROV or AUV. The seismic data acquisition positioning apparatus 100 can be deployed by shooting the seismic data acquisition unit 105. The seismic data acquisition positioning apparatus 100 can be deployed by ejecting the seismic data acquisition unit 105.

The seismic data acquisition positioning apparatus 100 can include an algorithm for automatic adjustments and corrections for errors. The seismic data acquisition positioning apparatus 100 can include an algorithm for automatic adjustments and corrections for issues. The seismic data acquisition positioning apparatus 100 can poll the seismic data acquisition unit 105 to confirm the seismic data acquisition unit 105 is at a designated location at a particular time. The seismic data acquisition positioning apparatus 100 can report that the seismic data acquisition unit 105 is at a designated location at a particular time.

The seismic data acquisition positioning apparatus 100 can land on the seafloor at a designated drop location (e.g., target area 710). The seismic data acquisition positioning apparatus 100 can may dynamic adjustments to land at or near the target area 710. The seismic data acquisition positioning apparatus 100 can travel laterally to land at or near the target area 710. The seismic data acquisition unit 105 can sink partially into the seafloor mud. The sink rate can be controlled such that the seismic data acquisition unit 105 does not sink deeply into the mud.

Figure 12:
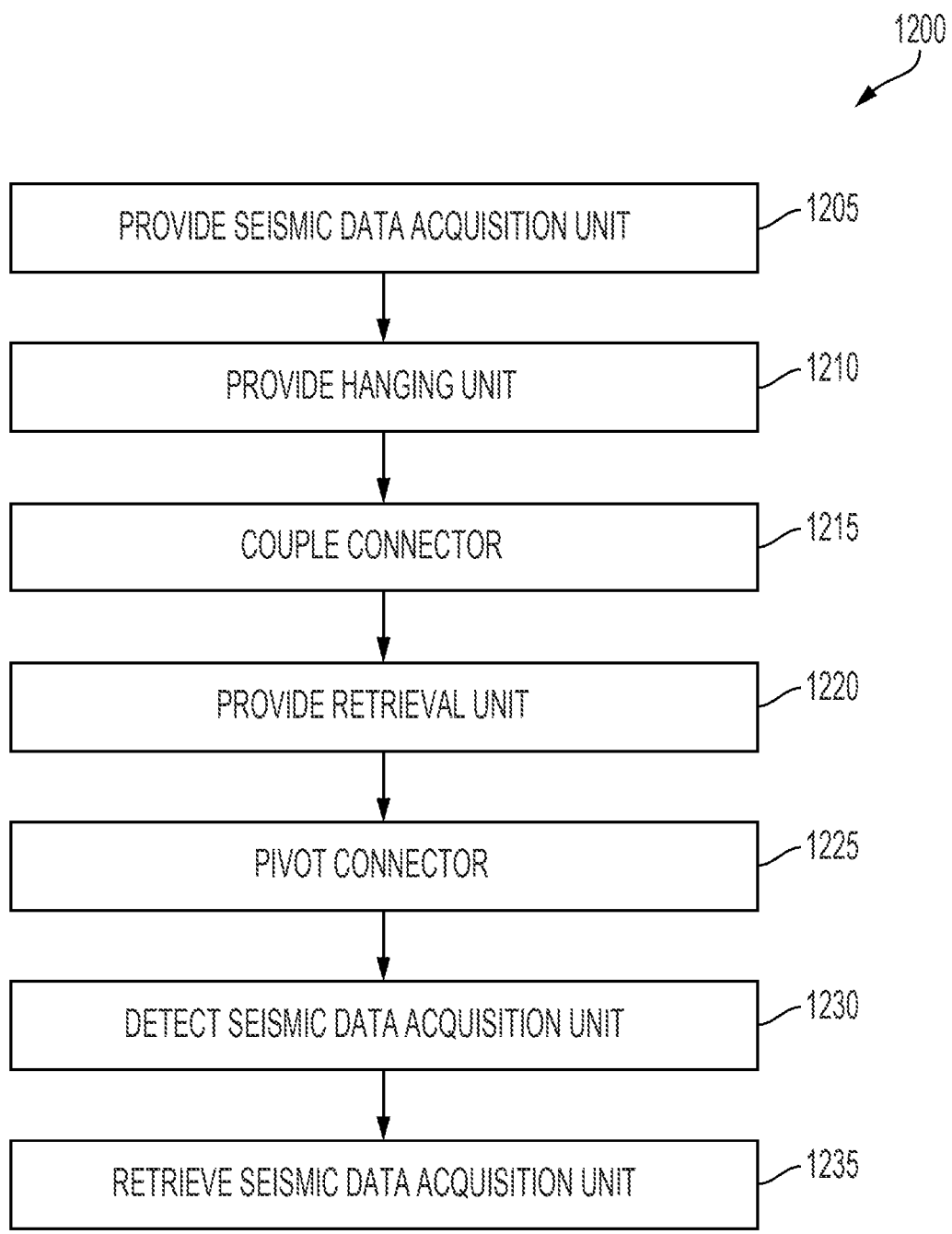
FIG. 12 illustrates a method of providing a seismic data acquisition positioning apparatus, according to an example implementation.

FIG. 12 illustrates a method of providing a seismic data acquisition positioning apparatus. In brief summary, the method 1200 can include providing a seismic data acquisition unit (BLOCK 1205). The method 1200 can include providing a hanging unit (BLOCK 1210). The method 1200 can include coupling a connector (BLOCK 1215). The method 1200 can include providing a retrieval unit (BLOCK 1220). The method 1200 can include pivoting the connector (BLOCK 1225). The method 1200 can include detecting the seismic data acquisition unit (BLOCK 1230). The method 1200 can include retrieving the seismic data acquisition unit (BLOCK 1235).

The method 1200 can include providing a seismic data acquisition unit (BLOCK 1205). The seismic data acquisition unit can have a first density. The seismic data acquisition unit can include a case having an internal compartment. The seismic data acquisition unit can include a power source, a clock, a seismic data recorder, a control unit, and at least one sensor disposed within the case. The seismic data acquisition unit can have a first buoyancy.

The method 1200 can include providing a hanging unit (BLOCK 1210). The hanging unit can include a beacon unit and having a second density. The second density can be less than the first density. The second density can be greater than the first density. The hanging unit can include a buoyant unit. The hanging unit can have a shape profile configured to control a lateral movement of the seismic data acquisition unit. The method 1200 can include indicating, by the beacon unit, a location of the seismic data acquisition unit on a seabed. The hanging unit can have a second buoyancy. The second buoyancy can be greater than the first buoyancy. The second buoyancy can be less than the first buoyancy. The first buoyancy can be less than the second buoyancy. The hanging unit can include a non-buoyant hanging unit.

The method 1200 can include coupling a connector (BLOCK 1215). The connector can have a first end. The first end of the connector can be coupled with the seismic data acquisition unit. The connector can have a second end. The second end of the connector can be coupled with the hanging unit. The method 1200 can include coupling a first connector. The first connector can have a first end. The first end of the first connector can be coupled with the seismic data acquisition unit. The first connector can have a second end. The second end of the first connector can be coupled with the hanging unit. Coupling the connector can include coupling the first connector with the seismic data acquisition unit on a first side of the seismic data acquisition unit. Coupling the connector can include coupling the second connector with the seismic data acquisition unit on the first side of the seismic data acquisition unit. The method 1200 can include coupling the seismic data acquisition unit with a seabed on via a second side of the seismic data acquisition unit. The method 1200 can include coupling the first connector with the seismic data acquisition unit via a first nylon rope. The method 1200 can include coupling the second connector with the seismic data acquisition unit via a second nylon rope. The method 1200 can include coupling a second connector having a first end with the seismic data acquisition unit and coupling the second connector having a second end with the hanging unit. The first connector and the second connector can have a rigidity greater than a rigidity of the retrieval unit. The method 1200 can include coupling a second connector. The second connector can have a first end. The first end of the second connector can be coupled with the seismic data acquisition unit. The second connector can have a second end. The second end of the second connector can be coupled with the hanging unit.

The method 1200 can include providing a retrieval unit (BLOCK 1220). The retrieval unit can have a third density. The third density can be less than the second density. The third density can be greater than the second density. The retrieval unit can have a first end coupled with a first portion of the hanging unit. The retrieval unit can have a second end coupled with a second portion of the hanging unit. The retrieval unit can have a third buoyancy. The third buoyancy can be greater than the second buoyancy. The third buoyancy can be less than the second buoyancy. The third buoyancy can be greater than the first buoyancy. The third buoyancy can be less than the first buoyancy. The second buoyancy can be less than the third buoyancy. The first buoyancy can be less than the third buoyancy. The retrieval unit can include a rope.

The method 1200 can include pivoting the connector (BLOCK 1225). The connector can be configured to pivot about the first end of the connector. The connector can pivot about a pivot point. For example, the connector can be configured to pivot about the first end of the connector. The pivot point can have little to no friction. The connector can include a pivoting member (e.g., pivoting leg). The connector can pivot when the seismic data acquisition unit reaches the seafloor.

The method 1200 can include detecting the seismic data acquisition unit (BLOCK 1230). For example, the method 1200 can include detecting, by an underwater vehicle, the seismic data acquisition unit via a beacon (e.g., acoustic beacon, optical beacon, sonar pinger, sonar unit, etc.) The beacon unit can initiate an acoustic transmission. The beacon unit can include an antenna. The beacon unit can be configured to transmit a location of the seismic data acquisition unit. The beacon unit can be configured to indicate a location of the seismic data acquisition unit on a seabed. For example, the beacon unit can indicate and transmit the GPS coordinates of the seismic data acquisition unit. The beacon unit can transmit heading information from a transducer or transponder. The beacon unit can be pinged periodically to transmit the location of the seismic data acquisition unit.

The method 1200 can include retrieving the seismic data acquisition unit (BLOCK 1235). For example, the method 1200 can include retrieving the seismic data acquisition unit by an underwater vehicle (e.g., remotely operated vehicle). Retrieving the seismic data acquisition unit can include retrieving the seismic data acquisition positioning apparatus. The remotely operated vehicle can grab a hoop formed by the retrieval unit using a hook. The remotely operated vehicle can pick up the seismic data acquisition unit directly. The remotely operated vehicle can include an arm (e.g., fixed arm or robotic arm) which can move towards the hoop formed by the retrieval unit. The arm can move within the perimeter of the hoop. The remotely operated vehicle can move the seismic data acquisition positioning apparatus via the hoop. For example, remotely operated vehicle can use the arm to lift rope up via the hoop, which can lift up the seismic data acquisition unit. The remotely operated vehicle can detect the seismic data acquisition unit via a beacon from the beacon unit. The remotely operated vehicle, using the hoop to pick up the seismic data acquisition unit, can more efficiently retrieve the seismic data acquisition units to more efficiently perform the seismic survey. For example, using the hoop configuration can save up to 30 seconds, 1 minute, 2 minutes or more per unit for retrieval, which can reduce the overall resource consumption of the underwater vehicle or ROV, battery usage, power usage, or number of units used. The remotely operated vehicle can perform a fly-by retrieval. A fly-by retrieval can include retrieving seismic data acquisition units while the remotely operated vehicle is in motion. The fly-by retrieval can save time over the remotely operated vehicle having to stop to retrieve nodes. The remotely operated vehicle can transmit status information for the seismic data acquisition unit. The remotely operated vehicle can detect the seismic data acquisition unit via a beacon from the beacon unit. The remotely operated vehicle can detect the seismic data acquisition unit via an optical beacon from the beacon unit.

Figure 13:
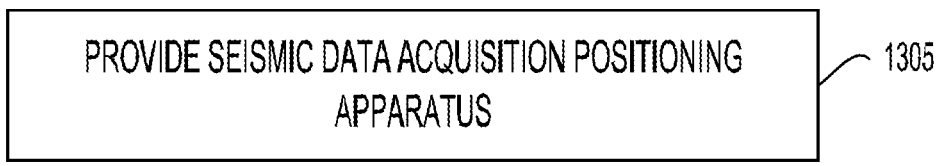
FIG. 13 illustrates a method of providing a seismic data acquisition positioning apparatus, according to an example implementation.

FIG. 13 illustrates a method 1300 of providing a seismic data acquisition positioning apparatus, according to an example implementation. The method 1300 can include providing a seismic data acquisition positioning apparatus (BLOCK 1305). The seismic data acquisition positioning apparatus can include a seismic data acquisition unit having a first density. The seismic data acquisition unit can include a case having an internal compartment. The seismic data acquisition unit can include a power source, a clock, a seismic data recorder, a control unit, and at least one sensor disposed within the case. The seismic data acquisition positioning apparatus can include a hanging unit including a beacon unit and having a second density. The seismic data acquisition positioning apparatus can include a connector having a first end coupled with the seismic data acquisition unit and having a second end coupled with the hanging unit. The seismic data acquisition positioning apparatus can include a retrieval unit having a third density and having an end coupled with the hanging unit.

Figure 14:
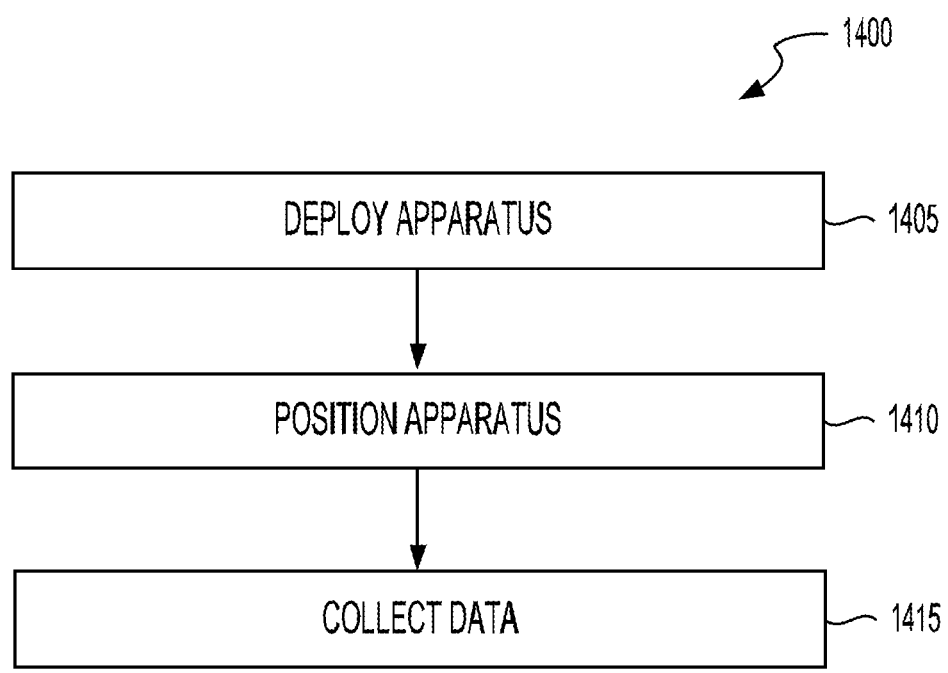
FIG. 14 illustrates a method of seismic data acquisition, according to an example implementation.

FIG. 14 illustrates a method 1400 of seismic data acquisition, according to an example implementation. In brief summary, the method 1400 can include deploying an apparatus (BLOCK 1405). The method 1400 can include positioning the apparatus (BLOCK 1410). The method 1400 can include collecting data (BLOCK 1415).

The method 1400 can include deploying an apparatus (BLOCK 1405). For example, the method 1400 can include deploying a seismic data acquisition positioning apparatus. The seismic data acquisition positioning apparatus can include a seismic data acquisition unit having a first density. The seismic data acquisition unit can include a case having an internal compartment. The seismic data acquisition unit can include a power source, a clock, a seismic data recorder, a control unit, and at least one sensor disposed within the case. The seismic data acquisition positioning apparatus can include a hanging unit including a beacon unit and having a second density. The seismic data acquisition positioning apparatus can include a connector having a first end coupled with the seismic data acquisition unit and having a second end coupled with the hanging unit. The seismic data acquisition positioning apparatus can include a retrieval unit having a third density and having an end coupled with the hanging unit. For seismic surveys, sparse nodes with streamer data can include seismic data acquisition units with long battery life. For example, the seismic data acquisition units can have a battery life of greater than 150 days. The seismic data acquisition units can have auxiliary batteries.

The method 1400 can include positioning the apparatus (BLOCK 1410). For example, the method 1400 can include positioning the seismic data acquisition positioning apparatus on a seabed. The seismic data acquisition positioning apparatus can be positioned on the seabed such that the hanging unit is above or on the seafloor. The seismic data acquisition positioning apparatus can be positioned on the seabed such that the seismic data acquisition unit is on or below the seabed. The seismic data acquisition positioning apparatus can be positioned on the seabed such that the retrieval unit is above the seafloor.

The method 1400 can include collecting data (BLOCK 1415). For example, the method 1400 can include collecting data (e.g., seismic data, gravity data, microgravity data, electromagnetic data, etc.) with the seismic data acquisition unit. A remotely operated vehicle can ping the beacon unit of the seismic data acquisition positioning apparatus. The remotely operated vehicle can transmit a signal to the seismic data acquisition positioning apparatus. The seismic data acquisition positioning apparatus can transmit data to a remotely operated vehicle. The method 1400 can include collecting data from the seismic data acquisition unit.

Figure 15:
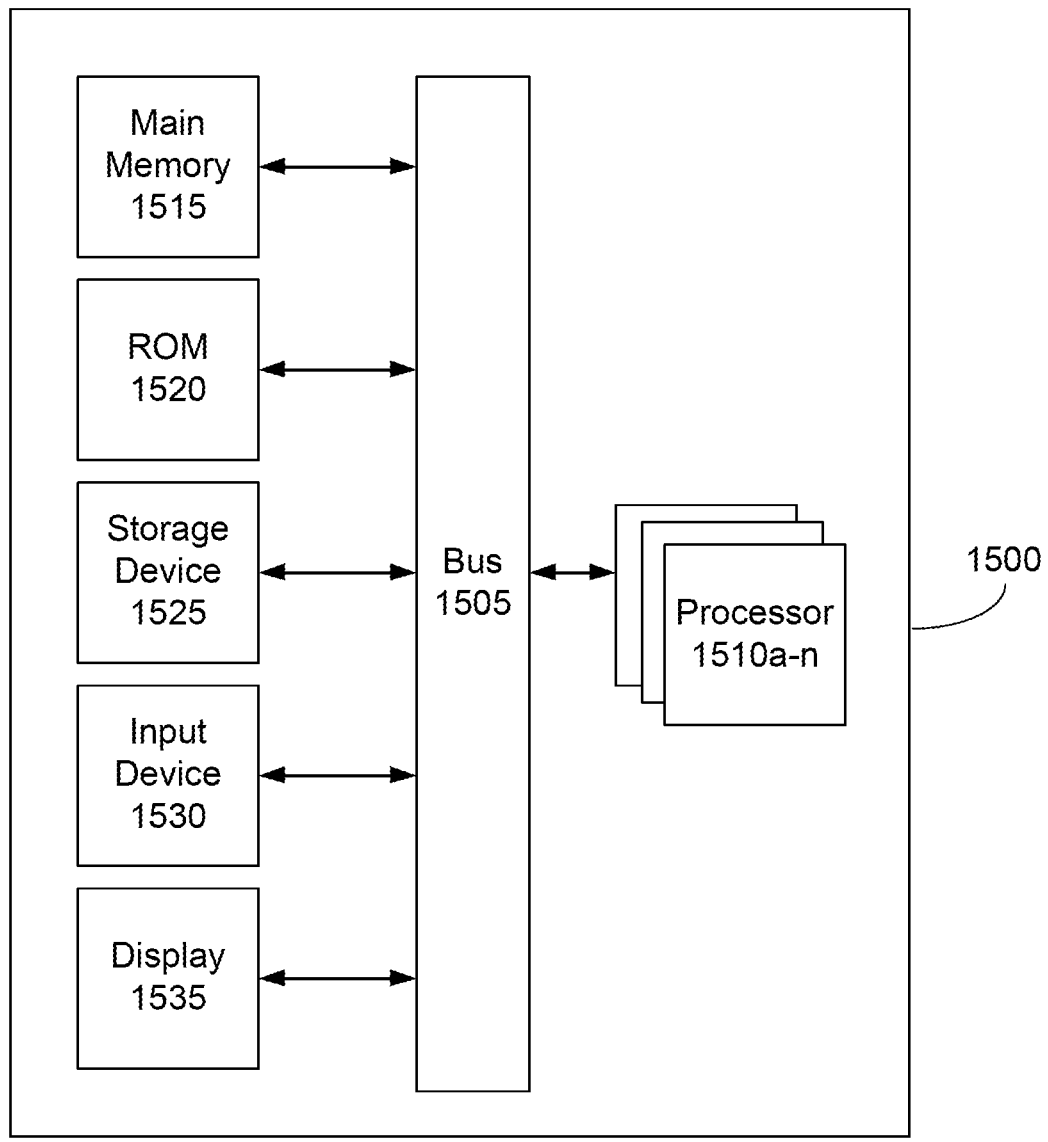
FIG. 15 depicts a block diagram of an architecture for a computing system employed to implement various elements of the systems or components depicted in FIGS. 1A-14.

FIG. 15 depicts a block diagram of an architecture for a computing system employed to implement various elements of the systems or components depicted in FIGS. 1A-14. FIG. 15 is a block diagram of a data processing system including a computer system 1500 in accordance with an embodiment. The data processing system, computer system or computing device 1500 can be used to implement one or more component configured to filter, translate, transform, generate, analyze, or otherwise process the data or signals depicted in FIGS. 1-11. The computing system 1500 includes a bus 1505 or other communication component for communicating information and a processor 1510 or processing circuit coupled to the bus 1505 for processing information. The computing system 1500 can also include one or more processors 1510 or processing circuits coupled to the bus for processing information. The computing system 1500 also includes main memory 1515, such as a random access memory (RAM) or other dynamic storage device, coupled to the bus 1505 for storing information, and instructions to be executed by the processor 1510. Main memory 1515 can also be used for storing seismic data, binning function data, images, reports, tuning parameters, executable code, temporary variables, or other intermediate information during execution of instructions by the processor 1510. The computing system 1500 may further include a read only memory (ROM) 1520 or other static storage device coupled to the bus 1505 for storing static information and instructions for the processor 1510. A storage device 1525, such as a solid state device, magnetic disk or optical disk, is coupled to the bus 1505 for persistently storing information and instructions.

The computing system 1500 may be coupled via the bus 1505 to a display 1535 or display device, such as a liquid crystal display, or active matrix display, for displaying information to a user. An input device 1530, such as a keyboard including alphanumeric and other keys, may be coupled to the bus 1505 for communicating information and command selections to the processor 1510. The input device 1530 can include a touch screen display 1535. The input device 1530 can also include a cursor control, such as a mouse, a trackball, or cursor direction keys, for communicating direction information and command selections to the processor 1510 and for controlling cursor movement on the display 1535.

The processes, systems and methods described herein can be implemented by the computing system 1500 in response to the processor 1510 executing an arrangement of instructions contained in main memory 1515. Such instructions can be read into main memory 1515 from another computer-readable medium, such as the storage device 1525. Execution of the arrangement of instructions contained in main memory 1515 causes the computing system 1500 to perform the illustrative processes described herein. One or more processors in a multi-processing arrangement may also be employed to execute the instructions contained in main memory 1515. In some embodiments, hard-wired circuitry may be used in place of or in combination with software instructions to effect illustrative implementations. Thus, embodiments are not limited to any specific combination of hardware circuitry and software.

Although an example computing system has been described in FIG. 15, embodiments of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources. The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, microprocessors, and any one or more processors of a digital computer. A processor can receive instructions and data from a read only memory or a random access memory or both. The elements of a computer are a processor for performing actions in accordance with instructions and one or more memory devices for storing instructions and data. A computer can include, or be operatively coupled to receive data from or transfer data to, or both, one or more mass storage devices for storing data, e.g., magnetic, magneto optical disks, or optical disks. A computer need not have such devices. Moreover, a computer can be embedded in another device, e.g., a personal digital assistant (PDA), a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The implementations described herein can be implemented in any of numerous ways including, for example, using hardware, software or a combination thereof. When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to or receive communications from other devices. The display unit(s) may be provided, for example, to allow a user to view various information in connection with execution of the instructions. The user input device(s) may be provided, for example, to allow the user to make manual adjustments, make selections, enter data or various other information, or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, electronic storage media, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the solution discussed above. The computer readable medium or media can be transportable, such that the program or programs stored thereon can be loaded onto one or more different computers or other processors to implement various aspects of the present solution as discussed above.

The terms "program" or "software" are used herein to refer to any type of computer code or set of computer-executable instructions that can be employed to program a computer or other processor to implement various aspects of embodiments as discussed above. One or more computer programs that when executed perform methods of the present solution need not reside on a single computer or processor, but may be distributed in a modular fashion amongst a number of different computers or processors to implement various aspects of the present solution.

Computer-executable instructions may be in many forms, such as program modules, executed by one or more computers or other devices. Program modules can include routines, programs, objects, components, data structures, or other components that perform particular tasks or implement particular abstract data types. The functionality of the program modules can be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Elements other than 'A' and 'B' can also be included.

The systems and methods described herein may be embodied in other specific forms without departing from the characteristics thereof. The foregoing implementations are illustrative rather than limiting of the described systems and methods.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A seismic data acquisition positioning apparatus, comprising:
a seismic data acquisition unit comprising:
a case having an internal compartment; and
a power source, a clock, a seismic data recorder, a control unit, and at least one sensor disposed within the case;
a hanging unit comprising a beacon unit;
a first connector having a first end coupled with the seismic data acquisition unit and having a second end coupled with the hanging unit;
a second connector having a first end coupled with the seismic data acquisition unit and having a second end coupled with the hanging unit, wherein the first connector and the second connector are coupled with the seismic data acquisition unit along a longitudinal axis of the hanging unit, and wherein the first connector and the second connector have a rigidity greater than a rigidity of a retrieval unit;
the retrieval unit having an end coupled with the hanging unit, the retrieval unit comprising a balloon; and
a gas canister coupled with the balloon and configured to inflate the balloon.

2. The apparatus of claim 1, wherein
the seismic data acquisition unit has a first density and the hanging unit has a second density;
the retrieval unit has a third density;
the second density is less than the first density; and
the third density is less than the second density.

3. The apparatus of claim 1, wherein
the first connector coupled with the seismic data acquisition unit on a first side of the seismic data acquisition unit;
the second connector coupled with the seismic data acquisition unit on the first side of the seismic data acquisition unit; and
the seismic data acquisition unit to couple with a seabed via a second side of the seismic data acquisition unit.

4. The apparatus of claim 1, wherein
the first connector and the second connector are coupled with the seismic data acquisition unit on a first side of the seismic data acquisition unit; and
the seismic data acquisition unit is to couple with a seabed via a second side of the seismic data acquisition unit.

5. The apparatus of claim 1, wherein the retrieval unit having a first end coupled with a first portion of the hanging unit and a second end coupled with a second portion of the hanging unit.

6. The apparatus of claim 1, wherein the hanging unit comprises a buoyant unit.

7. The apparatus of claim 1, wherein the hanging unit having a shape profile that is configured to hinder a lateral movement of the seismic data acquisition unit.

8. The apparatus of claim 1, wherein the beacon unit is configured to indicate a location of the seismic data acquisition unit on a seabed.

9. The apparatus of claim 1, wherein
the seismic data acquisition unit having a first buoyancy;
the hanging unit having a second buoyancy, the second buoyancy greater than the first buoyancy; and
the retrieval unit having a third buoyancy, the third buoyancy greater than the second buoyancy; and the seismic data acquisition positioning apparatus is non-buoyant.

10. The apparatus of claim 1, wherein the retrieval unit comprises a rope.

11. The apparatus of claim 1, wherein the hanging unit comprises a non-buoyant hanging unit.

12. A method, comprising:
providing a seismic data acquisition positioning apparatus comprising a seismic data acquisition unit, a hanging unit, and a retrieval unit;
providing the seismic data acquisition unit comprising:
a case having an internal compartment; and
a power source, a clock, a seismic data recorder, a control unit, and at least one sensor disposed within the case;
providing the hanging unit comprising a beacon unit;
coupling a first connector having a first end with the seismic data acquisition unit and coupling the first connector having a second end with the hanging unit;
coupling a first end of a second connector with the seismic data acquisition unit and a second end with the hanging unit, wherein the first connector and the second connector are coupled with the seismic data acquisition unit along a longitudinal axis of the hanging unit, and wherein the first connector and the second connector have a rigidity greater than a rigidity of the retrieval unit;
providing the retrieval unit having an end coupled with the hanging unit, the retrieval unit comprises a balloon; and
coupling a gas canister with the balloon, wherein the gas canister is configured to inflate the balloon, and wherein size of the balloon depends on size of the seismic data acquisition unit and a depth at which the seismic data acquisition unit settles on seafloor.

13. The method of claim 12, comprising:
retrieving the seismic data acquisition positioning apparatus by an underwater vehicle.

14. The method of claim 12, comprising:
detecting, by an underwater vehicle, the seismic data acquisition unit via a beacon.

* * * * *